(12) United States Patent
Nowatzyk et al.

(10) Patent No.: US 8,693,087 B2
(45) Date of Patent: Apr. 8, 2014

(54) PASSIVE MATRIX QUANTUM DOT DISPLAY

(75) Inventors: Andreas Nowatzyk, San Jose, CA (US); Rod Fleck, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 369 days.

(21) Appl. No.: 13/173,108

(22) Filed: Jun. 30, 2011

(65) Prior Publication Data

US 2013/0003163 A1 Jan. 3, 2013

(51) Int. Cl.
*G02B 26/00* (2006.01)
*G02F 1/133* (2006.01)
*G03G 13/00* (2006.01)

(52) U.S. Cl.
USPC .............................. 359/296; 349/33; 430/31

(58) Field of Classification Search
USPC ......... 359/296, 241, 237–238, 247, 265–270, 359/290–291, 301, 303–304, 321, 245, 359/253–254, 298; 349/71, 33, 106; 313/417–469; 362/84, 231, 555, 583, 362/284, 322, 324; 345/49, 105, 107; 430/31–32
See application file for complete search history.

(56) References Cited

U.S. PATENT DOCUMENTS

| | | | |
|---|---|---|---|
| 6,985,196 B2 | 1/2006 | Otake et al. | |
| 6,992,317 B2 | 1/2006 | Jain | |
| 7,085,460 B2 | 8/2006 | Leu | |
| 7,481,562 B2 | 1/2009 | Chua | |
| 2006/0061563 A1 | 3/2006 | Fleck | |
| 2007/0228927 A1* | 10/2007 | Kindler et al. | 313/495 |
| 2008/0259004 A1 | 10/2008 | Miller | |
| 2010/0001256 A1* | 1/2010 | Coe-Sullivan et al. | 257/13 |
| 2010/0208493 A1 | 8/2010 | Choi | |
| 2010/0328196 A1 | 12/2010 | Cok | |
| 2011/0095261 A1* | 4/2011 | Kazlas et al. | 257/13 |
| 2011/0220870 A1* | 9/2011 | Sulaiman et al. | 257/13 |
| 2012/0193551 A1* | 8/2012 | Christophersen et al. | 250/397 |

OTHER PUBLICATIONS

Achieving Full-Color Organic Light-Emitting Devices for Lightweight, Flat-Panel Displays—Published Date: 1997 http://ieeexplore.ieee.org/stamp/stamp.jsp?tp=&arnumber=605453.

* cited by examiner

*Primary Examiner* — Dawayne A Pinkney
(74) *Attorney, Agent, or Firm* — Micah Goldsmith; Sergey Lamansky; Micky Minhas

(57) ABSTRACT

A system and method for operating a light emitting device utilizing charged quantum dots is described. In one embodiment, charged quantum dots are suspended in a liquid between an excitation plate and a cover plate. The excitation plate carries short-wave excitation light. Charged quantum dots near the surface of the excitation plate may emit light in response to an evanescent field generated by the short-wave excitation light undergoing total internal reflection within the excitation plate. The excitation plate and the cover plate may be coated with one or more transparent electrodes. The movement of charged quantum dots within the liquid may be controlled by applying one or more bias voltages to the one or more transparent electrodes. Light emission from a particular region near the surface of the excitation plate may be controlled by moving charged quantum dots into or out of the particular region.

14 Claims, 21 Drawing Sheets

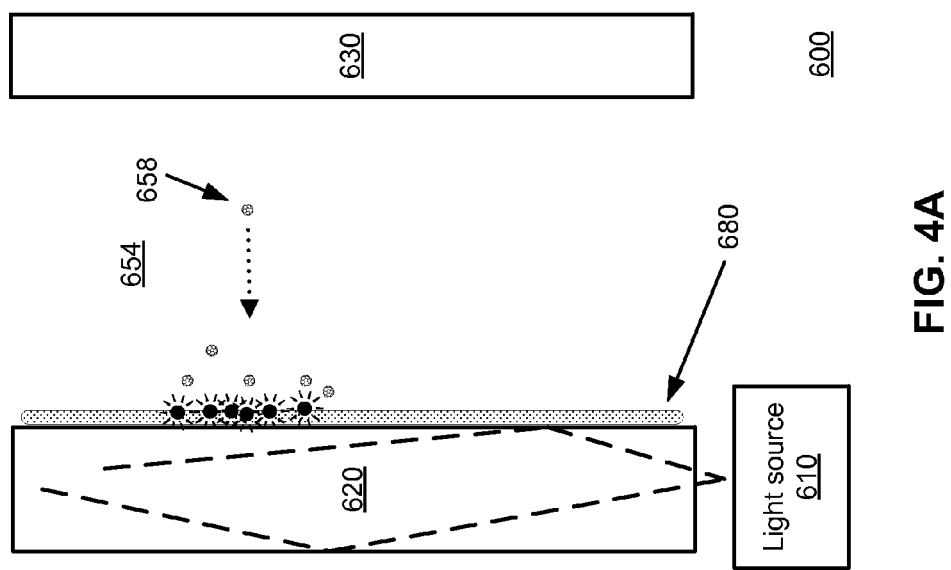

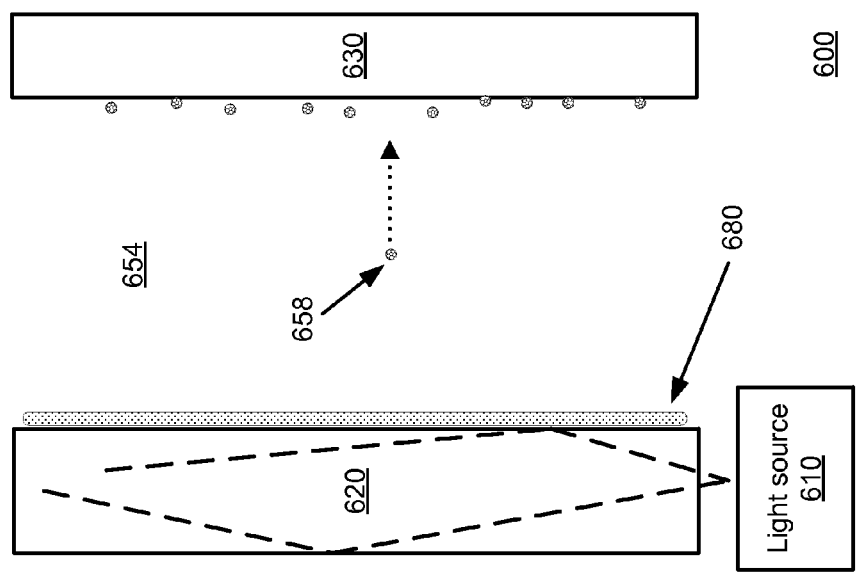

PASSIVE MATRIX QUANTUM DOT DISPLAY

BACKGROUND

Electronic displays are commonly used to provide a visual interface for many electronic devices including laptop computers, cell phones, and other mobile and non-mobile devices. An electronic display may generate visual information by generating light within the display and/or by modulating the light transmitted from the display. Today, the electronic displays commonly found in mobile devices include liquid crystal displays (LCDs) and electronic ink displays.

LCDs utilize the light modulating properties of liquid crystals. Because the liquid crystals inside an LCD do not emit light themselves, an LCD requires an external illumination source such as a backlighting device. Each pixel in an LCD display typically consists of a layer of liquid crystals aligned between a first transparent electrode and a first polarizing filter on one side of the liquid crystal layer and a second transparent electrode and a second polarizing filter on the other side of the liquid crystal layer. The first and second polarizing filters may be arranged such that light passing through the first polarizing filter is completely blocked by the second polarizing filter. If the light is completely blocked, then the pixel will appear black. By controlling the electric field applied across the liquid crystal layer, an LCD can modulate the light that is allowed to pass through the two polarizing filters, thereby creating a display with varying degrees of gray per pixel. In order to provide a color LCD display, each pixel may be further broken up into red, green, and blue subpixels with a red, green, and blue color filter associated with each of the three subpixels, respectively.

Electronic ink displays utilize microcapsules filled with a fluid and charged particles. In one example, a particular microcapsule may be filled with colored oil and charged colored particles. An electrical field may be applied to control the location of the charged colored particles within the particular microcapsule. When the charged colored particles are attracted to the display surface, then a color associated with the charged colored particles will be displayed. When the charged colored particles are moved away from the display surface, then the color of the oil will be displayed. In another example, an electronic ink display may utilize microcapsules that contain positively charged particles of one color and negatively charged particles of another color. In this example, an electric field may be applied to control whether the positively charged particles or the negatively charged particles are attracted to the display surface. The microcapsules used in electronic ink displays are not capable of emitting light and do not allow for a fully transparent display.

SUMMARY

Technology is described for operating a light emitting device utilizing charged quantum dots. In one embodiment, charged quantum dots are suspended in a liquid between an excitation plate and a cover plate. The excitation plate carries short-wave excitation light. Charged quantum dots near the surface of the excitation plate may emit light in response to an evanescent field generated by the short-wave excitation light undergoing total internal reflection within the excitation plate. The excitation plate and the cover plate may be coated with one or more transparent electrodes. The movement of charged quantum dots within the liquid may be controlled by applying one or more bias voltages to the one or more transparent electrodes. Light emission from a particular region near the surface of the excitation plate may be controlled by moving charged quantum dots into or out of the particular region.

One embodiment includes biasing a first conductor connected to an excitation plate to a first voltage and biasing a second conductor connected to a cover plate to a second voltage. The biasing of the first conductor causes quantum dots to accelerate towards the first conductor at a first point in time. The quantum dots are suspended within a liquid between the excitation plate and the cover plate. The quantum dots emit light in response to an evanescent field. The evanescent field is generated by one or more electromagnetic waves undergoing total internal reflection within the excitation plate.

One embodiment includes generating a first electric field across a first region at a first point in time. The first region is abutted by an excitation plate on a first side and a cover plate on a second side. The first region includes quantum dots suspended within a liquid between the excitation plate and the cover plate. The quantum dots emit light in response to an evanescent field. The evanescent field is generated by electromagnetic waves undergoing total internal reflection within the excitation plate. The generating of the first electric field causes the quantum dots to be attracted to the excitation plate. The method further includes generating a second electric field across the first region at a second point in time. The second point in time is subsequent to the first point in time. The generating of the second electric field causes the quantum dots to be attracted to the cover plate.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4A depicts one embodiment of a light emitting device wherein charged quantum dots are attracted to the surface of an excitation plate.

FIG. 4B depicts one embodiment of a light emitting device wherein charged quantum dots are repelled from the surface of an excitation plate and attracted to the surface of a cover plate.

DETAILED DESCRIPTION

Figure 1:
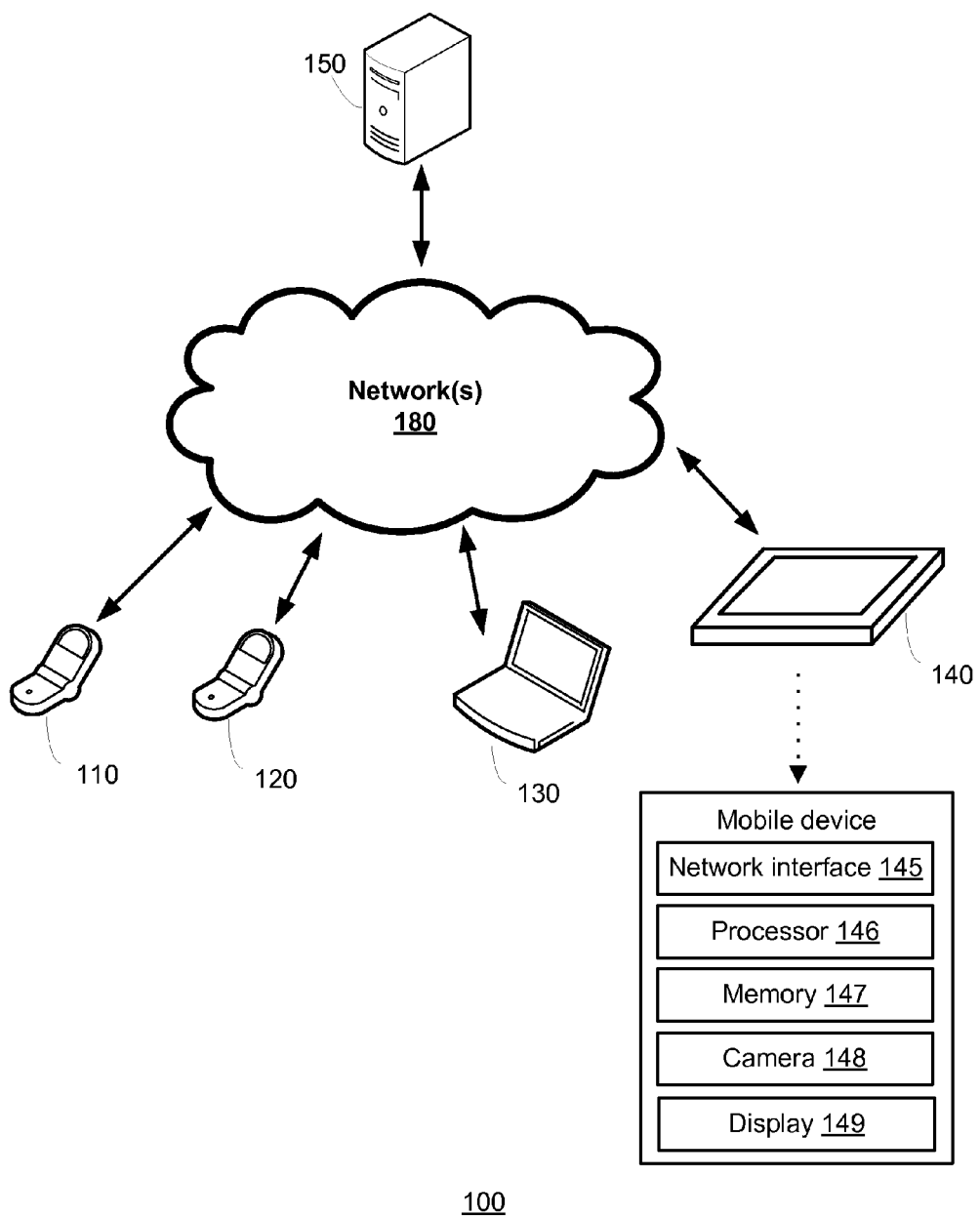
FIG. 1 is a block diagram of one embodiment of a networked computing environment in which the disclosed technology may be practiced.

Technology is described for operating a light emitting device utilizing charged quantum dots. In one embodiment, charged quantum dots are suspended in a liquid between an excitation plate and a cover plate. The excitation plate carries short-wave excitation light. Charged quantum dots near the surface of the excitation plate may emit light in response to an evanescent field generated by the short-wave excitation light undergoing total internal reflection within the excitation plate. The excitation plate and the cover plate may be coated with one or more transparent electrodes. The movement of charged quantum dots within the liquid may be controlled by applying one or more bias voltages to the one or more transparent electrodes. Light emission from a particular region near the surface of the excitation plate may be controlled by moving charged quantum dots into or out of the particular region.

In contrast to liquid crystals (used in LCDs) and microcapsules (used in electronic ink displays), quantum dots may emit light. In general, a quantum dot comprises a portion of matter (e.g., a semiconductor) whose excitons are confined in all three spatial dimensions. Consequently, quantum dots have electronic and optical properties between those of bulk semiconductors and discrete molecules. Quantum dots may be made of a binary alloy such as cadmium selenide, cadmium sulfide, indium arsenide, or indium phosphide. Quantum dots may also be made of a ternary alloy such as cadmium selenide sulfide. Some quantum dots may contain as few as 100 atoms within the quantum dot volume, with a corresponding diameter of roughly between 2 and 10 nanometers.

Quantum dots have a photoluminescent property to absorb light of a first wavelength (absorption spectrum) and to emit light of a second wavelength (emission spectrum) longer than the first wavelength. Quantum dots may be excited with light that has a wavelength that is shorter than their fluorescence wavelength. The color characteristics of the light emitted from a quantum dot depends on the chemical composition of the quantum dot, as well as the size and shape of the quantum dot. These properties of quantum dots, as emitters of light, confer the advantage that the light emission wavelength may be precisely tuned by varying the size of the quantum dot particle. Unlike organic dye molecules, which may have similar optical properties, quantum dots are very stable and tend not to degrade from prolonged exposure to short-wave light.

The physical reason that quantum dots of the same material, but of different sizes, can emit light of different colors is due to the quantum confinement effect. Due to the quantum confinement effect, the bandgap energy associated with a quantum dot becomes size dependent. Generally, the smaller the size of the quantum dot, the greater the difference in energy between the highest valence band and the lowest conduction band (i.e., the larger the bandgap). With a quantum dot, the bandgap energy that determines the energy of the florescent light (and hence the light of the color emitted) is inversely proportional to the size of the quantum dot. Therefore, the larger the quantum dot, the redder or lower energy the light emitted. Conversely, the smaller the quantum dot, the bluer or higher energy the light emitted.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 140, mobile devices 110 and 120, laptop computer 130, and application server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as application server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 140 includes a camera 148, display 149, network interface 145, processor 146, and memory 147, all in communication with each other. Camera 148 may capture digital images and/or videos. Display 149 may display digital images and/or videos. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In some embodiments, mobile device 140 may comprise a multimedia-enabled smart phone with wireless connectivity.

Mobile device 140 may include a display utilizing charged quantum dots. Quantum dots may be charged by depositing a permanent electrical charge on each of the quantum dots. The charged quantum dots may be suspended in a liquid between a first plate and a second plate. The direction and intensity of an electric field applied between the first and second plates may be used to influence the movement and location of the charged quantum dots within the liquid. Charged quantum dots located near the surface of the first plate may emit light in response to an evanescent field associated with the first plate. Thus, light emission from the charged quantum dots may be controlled by moving the charged quantum dots into or out of the evanescent field associated with the first plate.

Further, mobile device 140 may also include an overlay transparent display, where the transparent display is placed in front of a conventional display in order to provide a spatially separated overlay effect (e.g., in order to create a three-dimensional effect for objects being displayed on the conventional display). The transparent display may also comprise a two-way display, wherein the transparent display may be viewed from either side of the transparent display (i.e., the emitted light may be projected such that objects being displayed by the transparent display are visible from either side of the transparent display).

Figure 2:
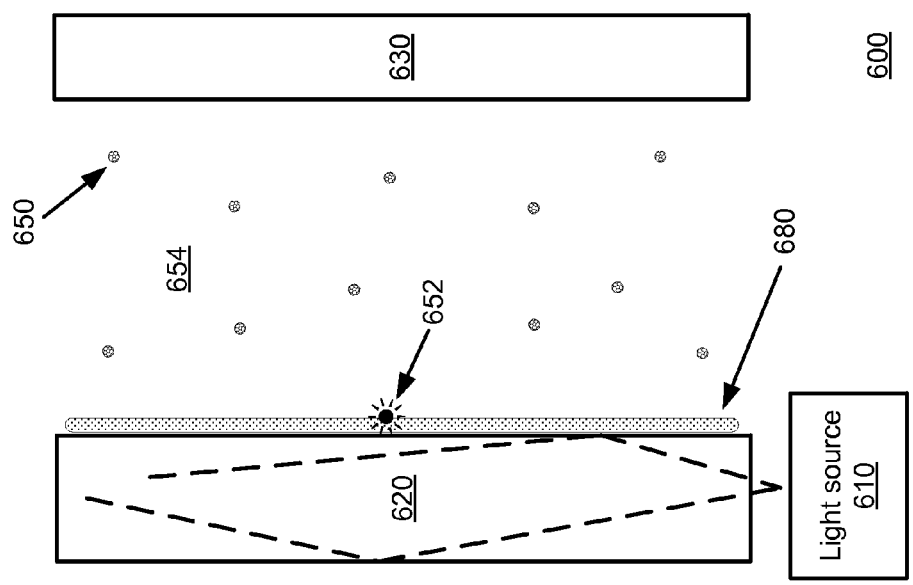
FIG. 2 depicts one embodiment of a light emitting device.

FIG. 2 depicts one embodiment of a light emitting device 600. Light emitting device 600 is one example of a display device such as display 149 in FIG. 1. Light emitting device 600 includes excitation plate 620, cover plate 630, and light source 610. As depicted, excitation plate 620 may comprise the entire excitation plate or a portion of the excitation plate. Cover plate 630 may comprise the entire cover plate or a portion of the cover plate. Light emitting device 600 also includes charged quantum dots 650 suspended in a clear or transparent fluid 654. As shown in FIG. 2, the excitation plate 620 and cover plate 630 may be arranged in a parallel plate configuration.

The fluid 654 in which the charged quantum dots 650 are suspended may be non-conductive and have an index of refraction that is lower than that of the excitation plate 620. The fluid 654 may also include an organic solvent such as isopropyl alcohol or glycerin. The excitation plate 620 and cover plate 630 may comprise transparent plates. The transparent plates may be made from glass or any equivalent material with suitable optical and mechanical properties. In one example, the transparent plates may comprise polyethylene terephthalate or other transparent plastic material like CR-39 (allyl diglycol carbonate, ADC). The excitation plate 620 and cover plate 630 may also comprise flexible materials. The excitation plate 620 may comprise an optical waveguide which may be used to distribute light from a light source such as light source 610.

Light source 610 may emit an excitation light comprising light of one or more particular frequencies (e.g., blue light or UV). The light source 610 may be positioned at one side of the excitation plate and emit the excitation light such that it is uniformly distributed throughout the excitation plate. Light source 610 may emit or radiate one or more colors of light. In one example, light source 610 may include a blue light emitting diode (LED), an ultraviolet LED, or a GaN-based LED as a light source. The light source 610 may be disposed at one side of a light guide plate. Although not illustrated, more than one light source may also be used to distribute short-wave excitation light throughout an excitation plate. For example, a second light source may be added on the opposite side of the light guide plate. In some embodiments, light from light source 610 may be selectively released or emitted from excitation plate 620.

The evanescent field 680, located near the surface of excitation plate 620, may be generated due to the excitation light emitted from light source 610 experiencing total internal reflection inside the excitation plate 620. The evanescent field 680 associated with the excitation plate 620 may extend a short distance beyond the surface of the excitation plate 620 depending on the wavelengths associated with the excitation light.

An evanescent field (or evanescent wave) has an intensity that exhibits exponential decay with distance from the boundary at which the evanescent field was formed. In optics, evanescent fields are created when electromagnetic waves traveling within a particular medium undergoes total internal reflection at a boundary (i.e., the electromagnetic waves strike the boundary at an angle greater than the critical angle). The physical explanation for the existence of evanescent fields is that the electric and magnetic fields cannot be discontinuous at a boundary. Evanescent fields have been used to exert optical radiation pressure on small particles in order to trap them for experimentation, and to illuminate very small objects such as biological cells for microscopy (e.g., total internal reflection fluorescence (TIRF) microscopy).

A charged quantum dot 652 within the evanescent field 680 may emit light of a particular frequency (or of a particular fluorescence spectra) depending on the size of the charged quantum dot 652. The particular frequency may be associated with a particular color. As shown in FIG. 2, the charged quantum dots 652 may be uniformly distributed between the excitation plate 620 and the cover plate 630. The uniform distribution may be due to Brownian motion (i.e., the random movement of particles suspended within a fluid) and/or due to the fact that charges of equal polarity will tend to repel each other. Further, a uniform distribution may also be created by the intentional application of one or more electric fields between the excitation plate 620 and the cover plate 630.

In one embodiment, the distance between the excitation plate 620 and the cover plate 630 is 50 microns and the evanescent field 680 extends from the surface of the excitation plate 620 by 0.5 microns. Assuming a uniform distribution of charged quantum dots 652, only 1% of the charged quantum dots would be within the evanescent field 680 and therefore be excited and emitting light. Consequently, the light output of the charged quantum dots 652 falls off rapidly as the charged quantum dots 652 are moved away from the excitation plate (i.e., the charged quantum dots will no longer emit light if they are more than 0.5 microns away from the surface of excitation plate 620). Because of this, the light output of a particular pixel is a nonlinear function of the quantum dot distribution between the excitation plate 620 and the cover plate 630. This nonlinearity may allow for a high multiplexing ratio, which in turn may allow for denser pixel areas. Further, another benefit of a high multiplexing ratio is that it allows the use of a passive matrix structure, which may be cheaper to manufacture than an active matrix structure.

A key property of utilizing charged quantum dots suspended within a liquid is the existence of a state storage mechanism associated with each pixel that is not directly dependent on the electric field applied to each pixel location. Because the quantum dots are charged, an electric field imparts an electrical force on the charged quantum dots, which causes the charged quantum dots to move in the direction of the electrical field. The movement of the charged quantum dots is opposed by inertia due to the mass of the charged quantum dots and the viscous drag from moving the charged quantum dots through the liquid. The drag may dominate, which means that the location of the charged quantum dots may depend on the integral of the applied electrical field subject to the limits imposed by the spacing between the excitation plate 620 and the cover plate 630. The velocity of a particular quantum dot of the charged quantum dots will depend on its size, its charge, and the viscosity of the liquid.

In some embodiments, the charged quantum dots 650 may be micro-encapsulated within one or more transparent, thin-walled micro-spheres that are then placed between excitation plate 620 and cover plate 630. While the operating principle remains the same, the micro-encapsulation may be use used to optimize the direction in which light is emitted. For example, each micro-sphere could act as a collimating lens to direct emitted light from the charged quantum dots 650, which would tend to concentrate at a point nearest to the excitation plate 620 (i.e., near a micro-sphere apex).

To further improve efficiency, small holes or grooves may be created within excitation plate 620. In one example, a self-aligning process may be used to etch small holes into excitation plate 620 near the micro-sphere/plate contact points for one or more of the micro-spheres.

Figure 3:
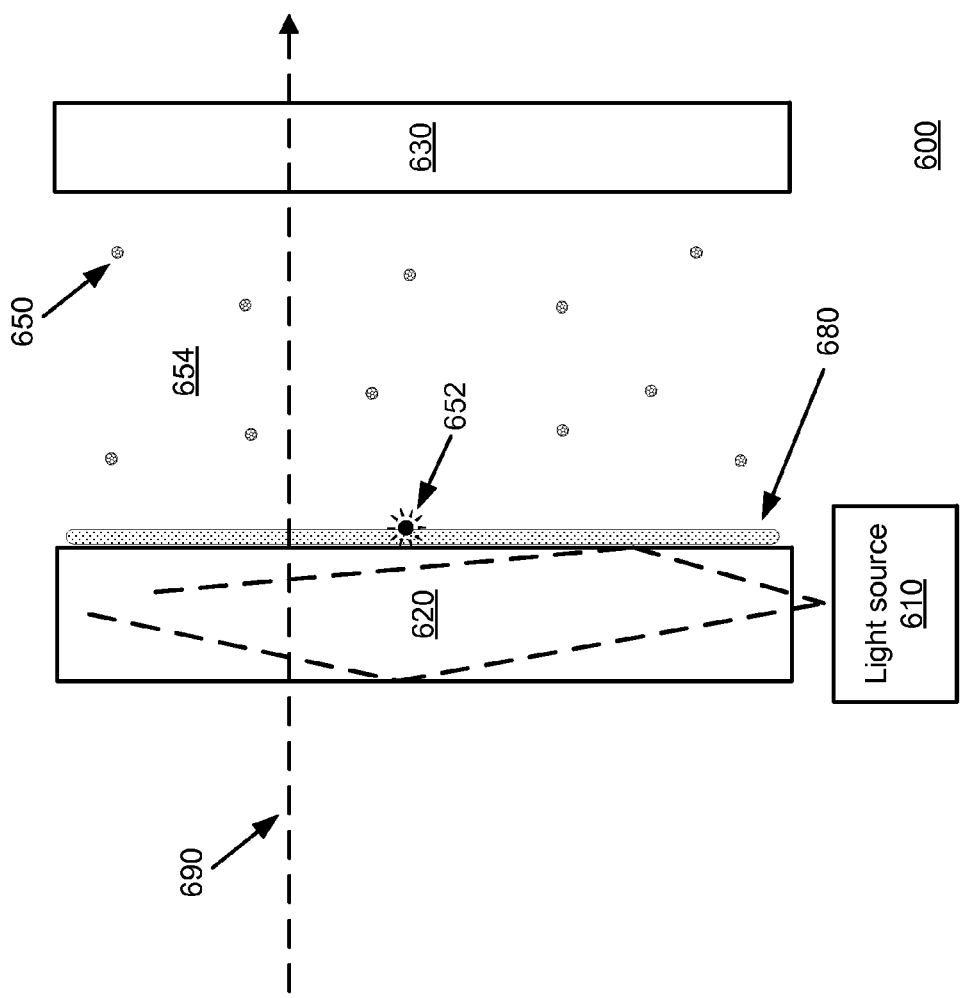
FIG. 3 depicts one embodiment of a light emitting device wherein the excitation plate and the cover plate comprise transparent materials.

FIG. 3 depicts one embodiment of a light emitting device 600 wherein the excitation plate 620 and the cover plate 630 comprise transparent materials. Light emitting device 600 is one example of a display device such as display 149 in FIG. 1. The use of transparent materials allows external light 690 to be transmitted through the two transparent plates. External light 690 may be sourced from a different display or from real objects outside the light emitting device 600. The use of a light emitting device 600 utilizing transparent plates allows the light emitting device 600 to overlay or augment the external light 690.

FIG. 4A depicts one embodiment of a light emitting device 600 wherein charged quantum dots 658 are attracted to the surface of excitation plate 620. Light emitting device 600 is one example of a display device such as display 149 in FIG. 1. In one embodiment, the charged quantum dots 658 may be positively charged. By applying an electric field between the excitation plate 620 and the cover plate 630 that attracts positively charged particles towards the excitation plate 620 (e.g., by applying a negative voltage to the excitation plate 620 and a positive voltage to the cover plate 630), the charged quantum dots 658 may be attracted to a particular region close to the surface of excitation plate 620. Once the charged quantum dots 658 are within the evanescent field 680, they may become excited and emit light. In one example, a negative voltage is applied between the excitation plate 620 and the cover plate 630 by applying 0V to the excitation plate 620 and 5V to the cover plate 630. If all of the charged quantum dots 658 are within the evanescent field 680, then the light emitted will be at a maximum intensity. If less than all of the charged quantum dots 658 are within the evanescent field 680, then the light emitted will be at a lower than maximum intensity. The number of charged quantum dots 658 located within the evanescent field 680 may be adjusted via the application of electric fields between the excitation plate 620 and cover plate 630 in order to modulate the intensity of the light emitted.

In another embodiment, the charged quantum dots 658 may be negatively charged. By applying an electric field between the excitation plate 620 and the cover plate 630 that attracts negatively charged particles towards the excitation plate 620, for example, by applying a positive voltage between the excitation plate 620 and the cover plate 630, the charged quantum dots 658 may be attracted to a particular region close to the surface of the excitation plate 620.

FIG. 4B depicts one embodiment of a light emitting device 600 wherein charged quantum dots 658 are repelled from the surface of excitation plate 620 and attracted to the surface of cover plate 630. Light emitting device 600 is one example of a display device such as display 149 in FIG. 1. In one embodiment, the charged quantum dots 658 may be positively charged. By applying an electric field between the excitation plate 620 and the cover plate 630 that attracts positively charged particles towards the cover plate 630, for example, by applying a positive voltage to the excitation plate 620 and a negative voltage to the cover plate 630, the charged quantum dots 658 may be attracted to a particular region close to the surface of cover plate 630. Once the charged quantum dots 658 are moved away from the evanescent field 680, they will not become excited and will not emit light. Thus, a pixel location in which no charged quantum dots are within the evanescent field 680 may appear dark because no light is being emitted from that pixel location.

In another embodiment, the charged quantum dots 658 may be negatively charged. By applying an electric field between the excitation plate 620 and the cover plate 630 that attracts negatively charged particles towards the cover plate 630, for example, by applying a negative voltage to the excitation plate 620 and a positive voltage to the cover plate 630, the charged quantum dots 658 may be attracted to a particular region close to the surface of the cover plate 630.

Figure 4C:
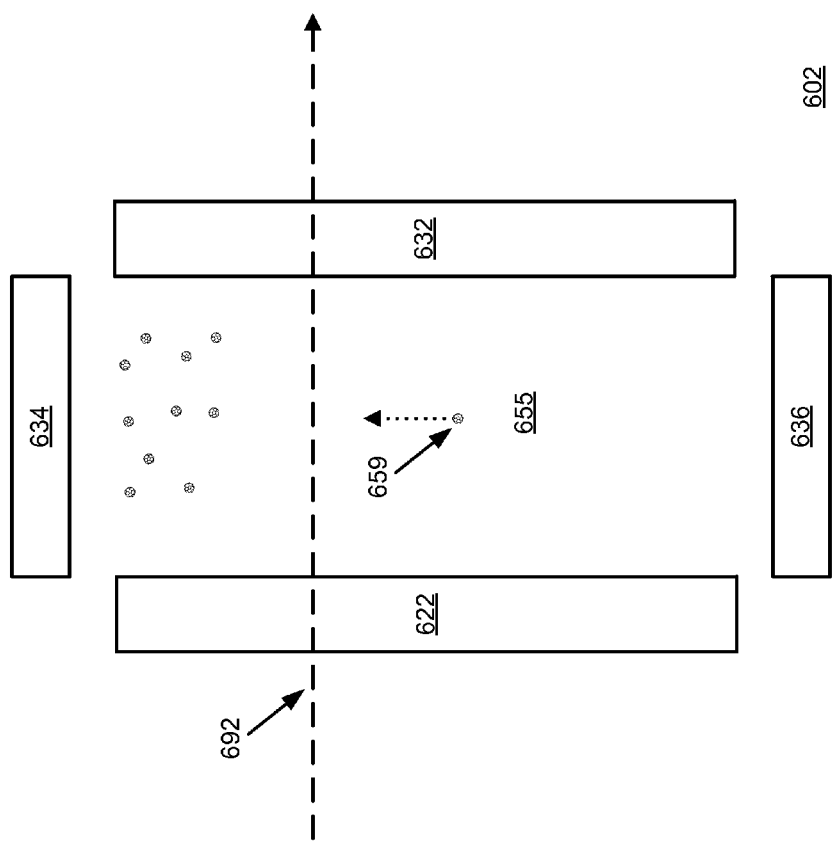
FIG. 4C depicts one embodiment of a portion of a light emitting device wherein charged quantum dots are attracted towards the surface of a top plate.

FIG. 4C depicts one embodiment of a portion of a light emitting device 602 wherein charged quantum dots 659 are attracted towards the surface of top plate 634. Light emitting device 602 is one example of a portion of a display device such as display 149 in FIG. 1. Light emitting device 602 includes a left plate 622, a right plate 632, a top plate 634, a bottom plate 636, and charged quantum dots 659 suspended within a transparent liquid 655. Both the left plate 622 and the right plate 632 may comprise transparent materials. External light 692 may include excitation light generated from a blue light or ultraviolet LED.

In one embodiment, the charged quantum dots 659 may be positively charged. By applying an electric field between the top plate 634 and the bottom plate 636 that attracts positively charged particles towards the top plate 634, for example, by applying a positive voltage to the bottom plate 636 and a negative voltage to the top plate 634, the charged quantum dots 659 may migrate towards the surface of top plate 634. By moving the charged quantum dots 659 out of a region associated with a display field (i.e., moving the charged quantum dots 659 into a "dead-zone"), external light 692 passing through left plate 622 will not cause the charged quantum dots 659 to emit light. Thus, the external light 692 will pass through the right plate 632 without being altered by the charged quantum dots 659.

In another embodiment, the charged quantum dots 659 include a first set of quantum dots and a second set of quantum dots. The first set of quantum dots is associated with quantum dots that emit light of a first color (e.g., red) and have a first polarity (e.g., are positively charged). The second set of quantum dots is associated with quantum dots that emit light of a second color (e.g., green) and have a second polarity (e.g., are negatively charged). Electric fields may be applied such that blue light is emitted from light emitting device 602 when all of the charged quantum dots 659 are moved into a "dead-zone," red light is emitted from light emitting device 602 when the first set of quantum dots are moved to the surface of left plate 622, and green light is emitted from light emitting device 602 when the second set of quantum dots are moved to the surface of left plate 622.

In some embodiments, a reflective material or coating not shown may be applied to the bottom of top plate 634 and to the top of bottom plate 636 in order to help redirect light through the liquid.

Figure 5A:
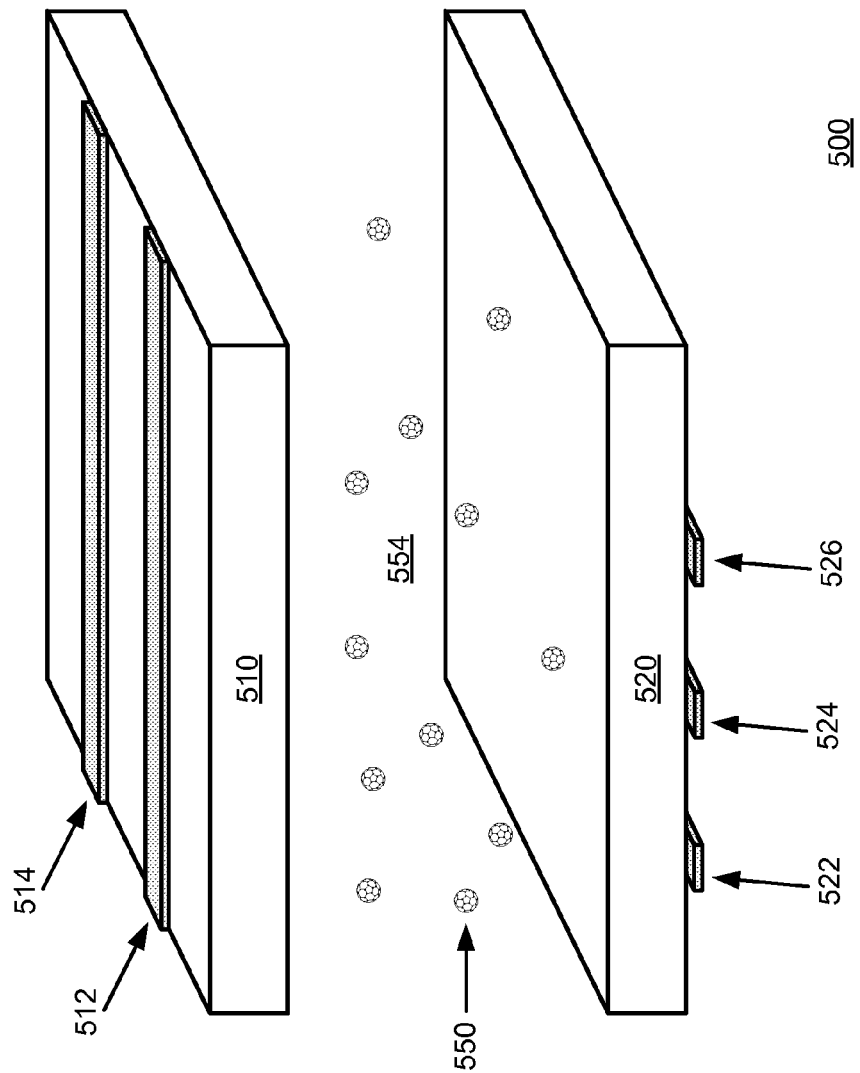
FIG. 5A depicts one embodiment of a light emitting device.

FIG. 5A depicts one embodiment of a light emitting device 500. Light emitting device 500 is one example of a display device such as display 149 in FIG. 1. Light emitting device 500 includes an excitation plate 520 and a cover plate 510. Excitation electrodes 522, 524, and 526 are connected to excitation plate 520. Cover electrodes 512 and 514 are connected to cover plate 510. Charged quantum dots 550 are suspended within a liquid 554 between the excitation plate 520 and the cover plate 510. The excitation and/or cover electrodes may be made of a thin, transparent conductive material such as indium tin oxide (ITO), indium zinc oxide (IZO), or nano-wire films. The excitation and/or cover electrodes may be formed and patterned on a glass plate or substrate using lithographic techniques. An anti-reflective coating not shown may be applied to the outer surfaces of light emitting device 500 in order to improve light transmission through the transparent display.

The excitation electrodes 522, 524, and 526 are arranged in a first direction and the cover electrodes 512 and 514 are arranged in a second direction perpendicular (or orthogonal) to the first direction. As shown in FIG. 5A, the excitation electrodes 522, 524, and 526 are deposited on the outer surface of the excitation plate 520 away from the charged quantum dots 550 and the cover electrodes 512 and 514 are also deposited on the outer surface of the cover plate 530 away from the charged quantum dots 550. The drawback of depositing electrodes on the outside surfaces of the light emitting device 500 is that the electric fields produced must extend through the bulk of both the excitation plate 520 and the cover plate 510.

Figure 5B:
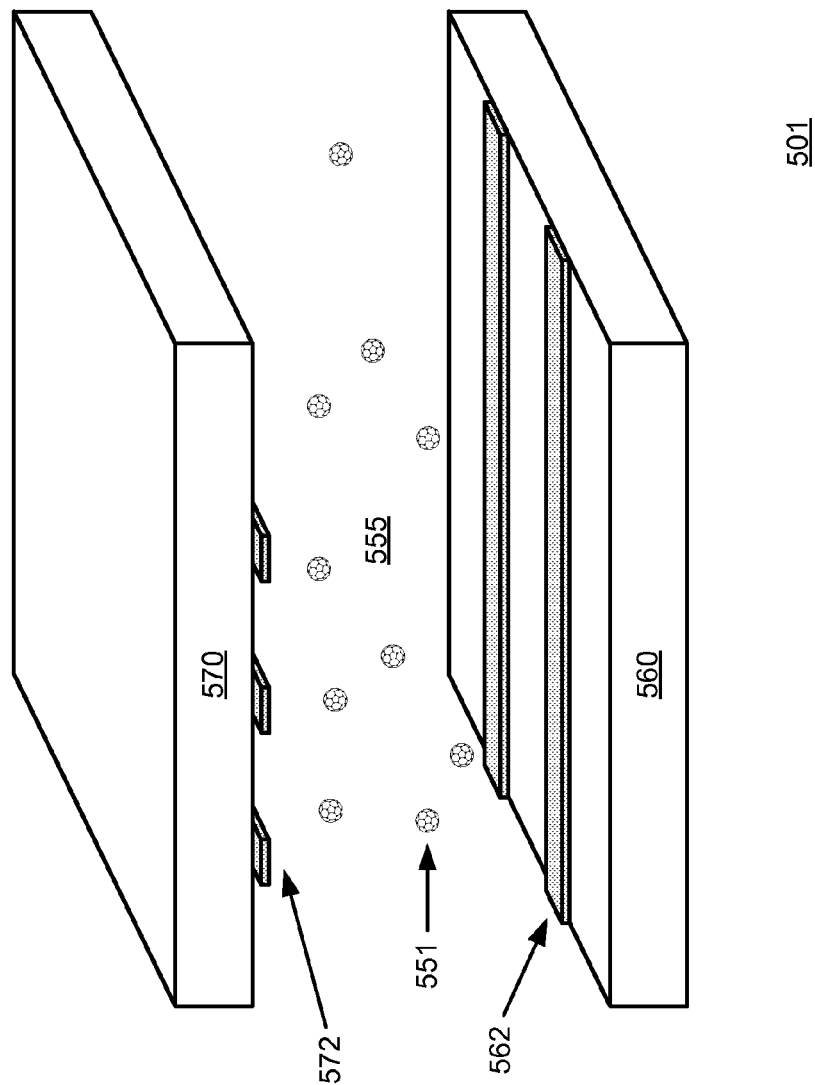
FIG. 5B depicts one embodiment of a light emitting device.

FIG. 5B depicts one embodiment of a light emitting device 501. Light emitting device 501 is one example of a display device such as display 149 in FIG. 1. Light emitting device 501 includes an excitation plate 560 and a cover plate 570. Excitation electrode 562 is connected to excitation plate 560. Cover electrode 572 is connected to cover plate 570. Charged quantum dots 551 are suspended within a liquid 555 between the excitation plate 560 and the cover plate 570. The excitation and/or cover electrodes may be made of a thin, transparent conductive material such as ITO or IZO. The excitation and/or cover electrodes may be formed and patterned on a glass plate or substrate using lithographic techniques.

As shown in FIG. 5B, the excitation electrode 562 is deposited on the inner surface of the excitation plate 560 facing the charged quantum dots 551 and the cover electrode 572 is also deposited on the inner surface of the cover plate 570 facing the charged quantum dots 551. The drawback of depositing electrodes on the inside surfaces of the light emitting device 501 within the liquid filled region separated by the excitation plate 560 and the cover plate 570 is that the electrode material and thickness may attenuate the evanescent field generated by the excitation plate 560. This would effectively reduce the range over which the charged quantum dots 551 may be excited. Other configurations of excitation electrodes and cover electrodes may also be used.

Figure 6A:
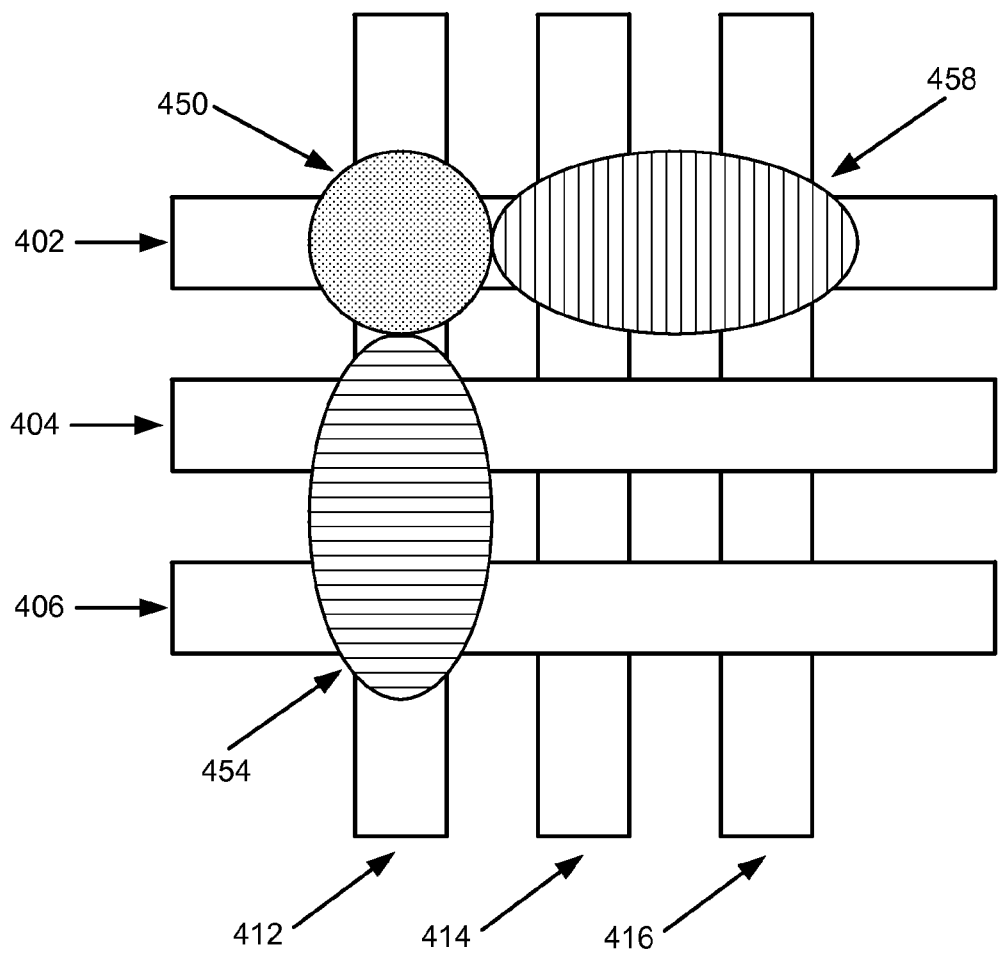
FIG. 6A depicts excitation electrodes and cover electrodes arranged in a grid pattern.

FIG. 6A depicts excitation electrodes 402, 404, and 406 and cover electrodes 412, 414, and 416 arranged in a grid pattern. In one example, the excitation electrodes 402, 404, and 406 may correspond with excitation electrodes 522, 524, and 526 in FIG. 5A and cover electrodes 412 and 414 may correspond with cover electrodes 512 and 514 in FIG. 5A. The grid pattern depicted in FIG. 6A may comprise part of a passive matrix structure used to apply electric fields to particular regions corresponding with overlap regions between one or more excitation electrodes and one or more cover electrodes. The intersection of one of the one or more excitation electrodes and one of the one or more cover electrodes may form a region associated with one pixel of a display.

The excitation electrodes 402, 404, and 406 may be arranged in a first direction and the cover electrodes 412, 414, and 416 may be arranged in a second direction perpendicular to the first direction. As shown in FIG. 6A, the plane including the excitation electrodes is above the plane including the cover electrodes; the excitation plate not shown is above the cover plate not shown. In one embodiment, a quantum dot display may include 2000 excitation electrodes arranged in a first direction and 2000 cover electrodes arranged in a second direction in order to control the selection of 4 million pixel locations.

Electric field region 450 corresponds with the overlap region between excitation electrode 402 and cover electrode 412. Electric field region 458 corresponds with the overlap region between excitation electrode 402 and cover electrodes 404 and 416. Electric field region 454 corresponds with the overlap region between the excitation electrodes 404 and 406 and cover electrode 412. The electric field region 450 may be referred to as the selected region. The electric field regions corresponding with the overlap regions between excitation electrodes 404 and 406 and cover electrodes 404 and 416 may be referred to as the unselected regions. The electric field region 458 and the electric field region 454 may both be referred to as half selected regions.

In one embodiment, positively charged quantum dots are attracted towards a portion of an excitation plate associated with the selected region (i.e., electric field region 450). In this case, a negative voltage (e.g., −5V) may be applied to excitation electrode 402, while a positive voltage (e.g., +5V) may be applied to cover electrode 412 in order to create an electric field within electric field region 450 that attracts positively charged quantum dots towards the portion of the excitation plate associated with the selected region. A second negative voltage (e.g., −5V) may be applied to cover electrodes 414 and 416, while a second positive voltage (e.g., +5V) may be applied to excitation electrodes 404 and 406 in order to create an electric field within the unselected regions that attracts positively charged quantum dots towards the cover plate. Further, the aforementioned biasing of excitation electrodes 402, 404, and 406 and cover electrodes 412, 414, and 416 will create an electric field within the half selected region comprising electric field region 458 that neither attracts nor repels charged quantum dots (i.e., the voltage gradient between excitation electrode 402 and cover electrodes 414 and 416 is zero). The aforementioned biasing of excitation electrodes 402, 404, and 406 and cover electrodes 412, 414, and 416 will also create an electric field within the half selected region comprising electric field region 454 that neither attracts nor repels charged quantum dots (i.e., the voltage gradient between excitation electrodes 404 and 406 and cover electrode 412 is zero).

In another embodiment, negatively charged quantum dots are attracted towards a portion of an excitation plate associated with the selected region (i.e., electric field region 450). In this case, a positive voltage (e.g., +1V) may be applied to excitation electrode 402, while a negative voltage (e.g., −1V) may be applied to cover electrode 412 in order to create an electric field within electric field region 450 that attracts negatively charged quantum dots towards the portion of the excitation plate associated with the selected region. Similar to the biasing scheme described above, a second positive voltage (e.g., +1V) may be applied to cover electrodes 414 and 416, while a second negative voltage (e.g., −1V) may be applied to excitation electrodes 404 and 406 in order to create an electric field within the unselected regions that attracts negatively charged quantum dots towards the cover plate. Further, the aforementioned biasing of excitation electrodes 402, 404, and 406 and cover electrodes 412, 414, and 416 will create an electric field within the half selected regions that neither attracts nor repels charged quantum dots. Other biasing schemes may also be used.

An electronic display comprising charged quantum dots may utilize a passive matrix structure or an active matrix structure. A passive matrix structure typically uses a grid structure, such as the grid structure depicted in FIG. 6A, to supply voltages to a particular pixel region. An advantage of the passive matrix structure is that it is a simple structure to manufacture. However, in some cases, in order to achieve greater contrast, it may be necessary to isolate the voltages controlling each pixel region. This may be accomplished using an active matrix structure. An active matrix structure provides a dedicated transistor (e.g., a thin-film transistor) per pixel in order to better control the voltages applied to each pixel region.

In one embodiment, an active matrix structure may include a plurality of row lines and a plurality of column lines. Each row line of the plurality of row lines may control the gate terminals of a plurality of dedicated transistors corresponding with a row of pixels. Each column line of the plurality of column lines may control a drain terminal of a dedicated transistor of the plurality of dedicated transistors. Therefore, when a particular row line is selected, the selected row line allows each of a plurality of dedicated transistors to pass a particular bias voltage from a particular column line onto an electrode associated with a particular pixel region. In general, active matrix displays look brighter and sharper than passive matrix displays of the same size, however, they are also more expensive to manufacture. In one embodiment, an active matrix structure may be deposited onto the cover plate. This would allow a single-sided structure wherein the excitation plate electrode may simply include a continuous conductive sheet (e.g., a continuous sheet of ITO).

Figure 6B:
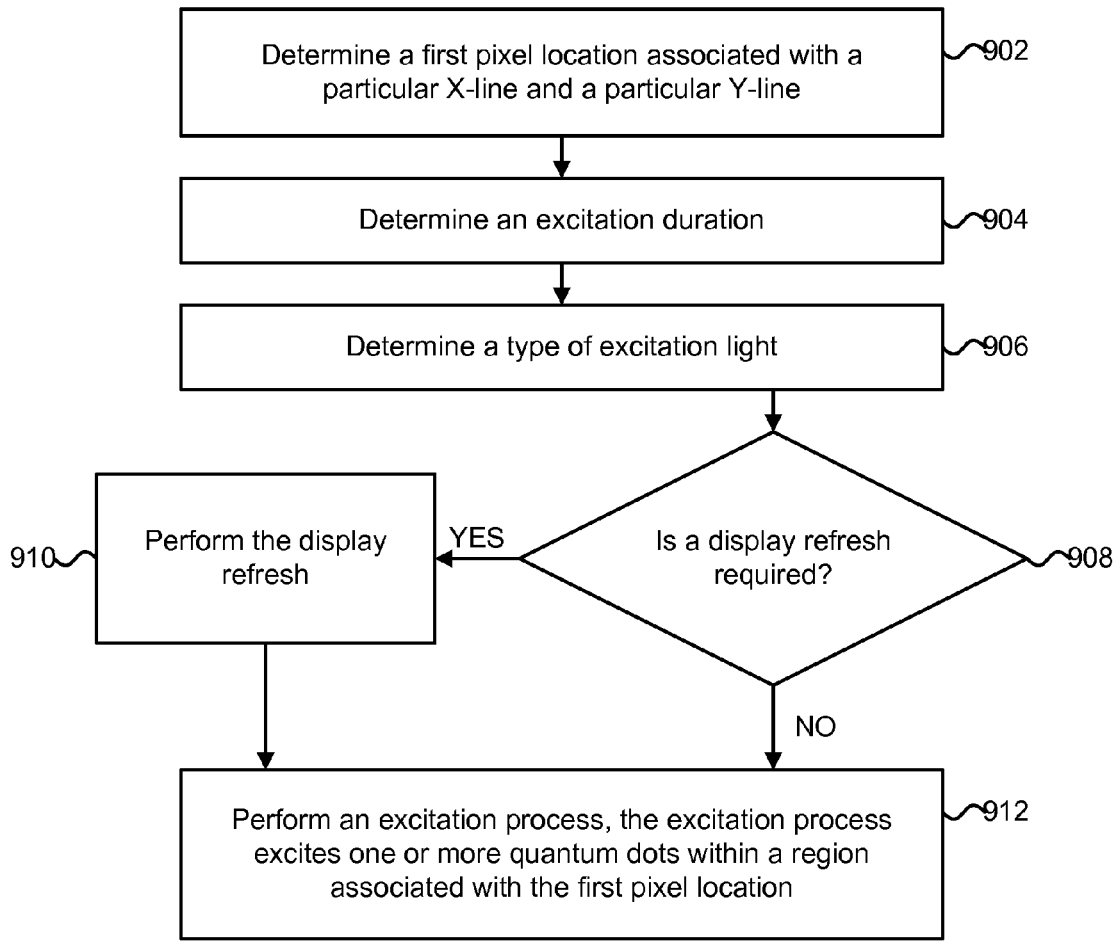
FIG. 6B is a flowchart describing one embodiment of a process for causing charged quantum dots to emit light from a region associated with a particular pixel location.

FIG. 6B is a flowchart describing one embodiment of a process for causing charged quantum dots to emit light from a region associated with a particular pixel location. For example, the particular pixel location may correspond with a selected region (e.g., electric field region 450 in FIG. 6A). The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 6B is performed by a processor such as processor 146 in FIG. 1.

In step 902, a first pixel location associated with a particular X-line and a particular Y-line is determined. The particular X-line may comprise an excitation electrode such as excitation electrode 402 in FIG. 6A. The particular Y-line may comprise a cover electrode such as cover electrode 412 in FIG. 6A. The first pixel location may be determined by decoding one or more computing instructions associated with a display image. In step 904, an excitation duration is determined. The excitation duration may be associated with the period of time during which excitation light is emitted into an excitation plate, and therefore the duration during which an evanescent field near the surface of the excitation plate is created. In step 906, a type of excitation light is determined. In one example, the excitation light comprises light associated with wavelengths between 450 nm and 475 nm (i.e., blue light). In another example, the excitation light comprises light associated with wavelengths covering the entire visible spectrum.

In step 908, it is determined whether a display refresh is required. A display refresh places charged quantum dots into a predetermined location or region between the excitation plate and the cover plate. A display refresh may be required after a certain number of the excitation process cycles, after a certain period of time has elapsed, or prior to every excitation process. In one embodiment, the charge associated with the charged quantum dots and the viscosity of the liquid are chosen such that the time required for the quantum dots to move between the excitation plate and the cover plate is compatible with a desired refresh rate of the display. If a display refresh is required, then a display refresh is performed in step 910. If a display refresh is not required, then an excitation process is performed in step 912.

In step 912, quantum dots within a region associated with the first pixel location are excited by performing an excitation process. The excitation process may include attracting one or more charged quantum dots towards a region associated with the first pixel location by applying an electric field, waiting a sufficient period of time for the one or more charged quantum dots to settle near a surface of the excitation plate associated with the first pixel location, and pulsing an excitation light source into the excitation plate causing the creation of an evanescent field near the surface of the excitation plate.

Figure 6C:
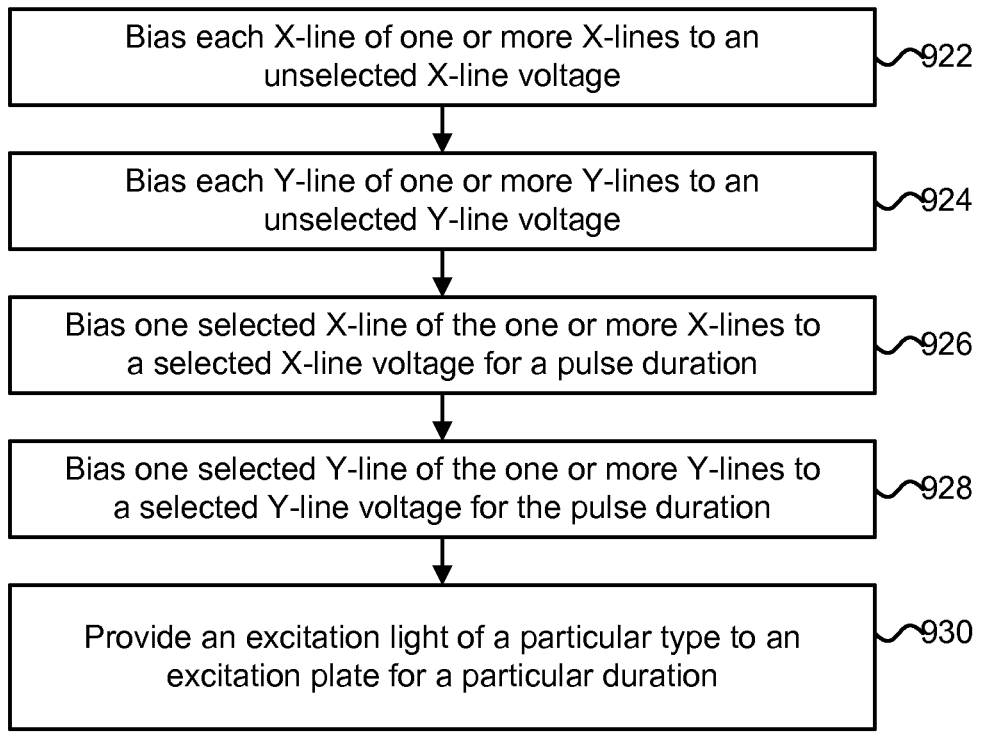
FIG. 6C is a flowchart describing one embodiment of a process for performing an excitation process.

FIG. 6C is a flowchart describing one embodiment of a process for performing an excitation process. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 6C is performed by a processor such as processor 146 in FIG. 1. The process depicted in FIG. 6C is one example of a process for implementing step 912 in FIG. 6B.

In step 922, each X-line of one or more X-lines is biased to an unselected X-line voltage. The one or more X-lines may comprise one or more excitation plate electrodes. In step 924, each Y-line of one or more Y-lines is biased to an unselected Y-line voltage. The one or more Y-lines may comprise one or more cover plate electrodes. In step 926, one selected X-line of the one or more X-lines is biased to a selected X-line voltage for a pulse duration. In step 928, one selected Y-line of the one or more Y-lines is biased to a selected Y-line voltage for the pulse duration. In one embodiment, after steps 926 and 928, an electric field is generated across a selected region corresponding with an overlap region between the one selected X-line and the one selected Y-line. The selected X-line voltage and the selected Y-line voltage may be determined based on the direction and strength of the electric field required to attract charged quantum dots towards the portion of the excitation plate within the selected region. Other biasing schemes, such as those described in reference to FIG. 6A, may also be applied.

The pulse duration may be set in order to move one or more charged quantum dots from an initial position (e.g., a position related to a refresh operation) to a particular surface region of the excitation plate associated with a selected region. The determination of the pulse duration may take into consideration the size of the one or more charged quantum dots, the amount of charge associated with the one or more charged quantum dots, and the viscosity of the liquid in which the one or more charged quantum dots are held in suspension.

In one embodiment, the steps of biasing the one selected X-line to a selected X-line voltage and biasing the one selected Y-line to a selected Y-line voltage may be performed concurrently. Together, steps 926 and 928 produce one or more electric fields in order to move one or more charged quantum dots to be located within the selected region near the surface of the excitation plate.

In step 930, an excitation light of a particular type is provided to an excitation plate for a particular duration. The particular duration may correspond with the excitation duration determined in step 904 of FIG. 6B. In one example, the particular duration may be 10 ns. The particular type of excitation light may correspond with the type of excitation light determined in step 906 of FIG. 6B. In one example, the particular type of excitation light may include blue light. The excitation light may be emitted from a light source, such as light source 610 in FIG. 2. Pulsing the excitation light for the particular duration after the one or more charged quantum dots have been moved near the surface of the excitation plate may allow for better control of the excitation process. In one embodiment, excitation light of a particular type is pulsed for a particular duration in order to generate an evanescent field after one or more charged quantum dots have been positioned near a surface of the excitation plate within a selected region. In another embodiment, excitation light of a particular type may be pulsed for a particular duration while one or more charged quantum dots are being moved near a surface of the excitation plate.

Figure 6D:
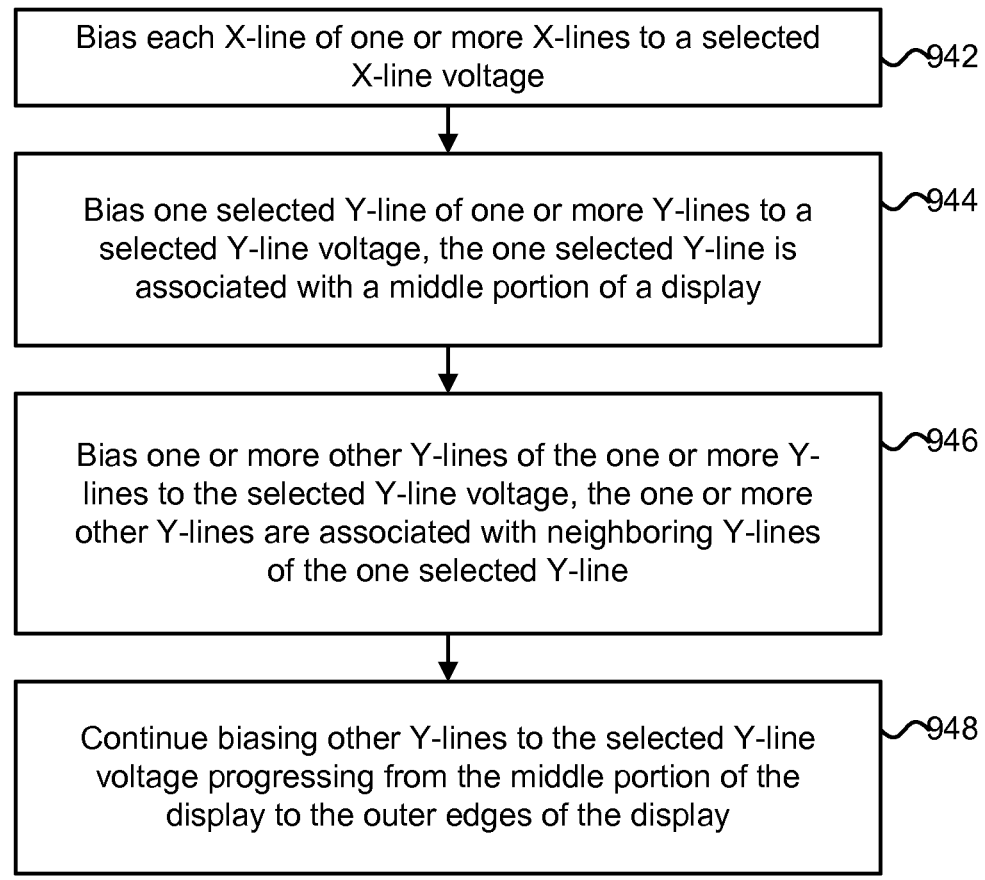
FIG. 6D is a flowchart describing one embodiment of a process for performing a display refresh operation.

FIG. 6D is a flowchart describing one embodiment of a process for performing a display refresh operation. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 6D is performed by a processor such as processor 146 in FIG. 1. The process depicted in FIG. 6D is one example of a process for implementing step 910 in FIG. 6B.

Prior to performing a display refresh, excitation light used to create an evanescent field may be turned off in order to prevent unintentional light emission. In step 942, each X-line of one or more X-lines is biased to a selected X-line voltage. The one or more X-lines may comprise one or more excitation plate electrodes. In step 944, one selected Y-line of one or more Y-lines is biased to a selected Y-line voltage, the one selected Y-line is associated with a middle portion of a display. The one or more Y-lines may comprise one or more cover plate electrodes. In step 946, one or more other Y-lines of the one or more Y-lines are biased to the selected Y-line voltage, the one or more other Y-lines are associated with neighboring Y-lines of the one selected Y-line. In step 948, other Y-lines are biased to the selected Y-line voltage progressing from the middle portion of the display to the outer edges of the display.

In one embodiment of a display refresh operation, one or more charged quantum dots are first positioned along a middle portion of the display and are subsequently spread out from the middle portion towards the edges of the display. In another embodiment, the one or more charged quantum dots are first positioned along the edges of the display and are subsequently moved towards the middle of the display. Other refreshing schemes may also be used.

Figure 7A:
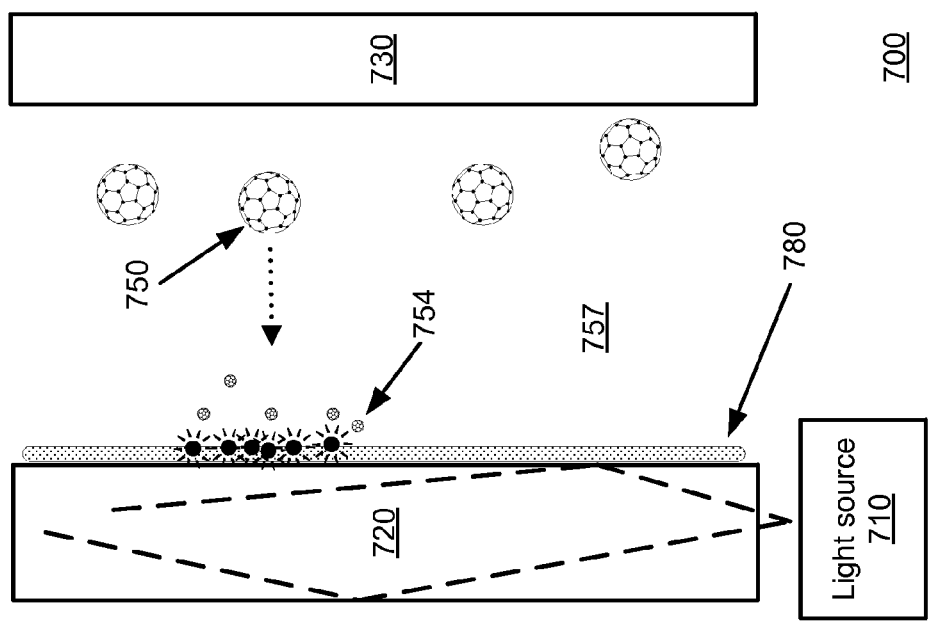
FIG. 7A depicts one embodiment of a light emitting device emitting light associated with smaller quantum dots.

FIG. 7A depicts one embodiment of a light emitting device 700 emitting light associated with smaller quantum dots. Light emitting device 700 is one example of a display device such as display 149 in FIG. 1. Light emitting device 700 includes an excitation plate 720, a cover plate 730, and light source 710. As depicted, excitation plate 720 may comprise the entire excitation plate or a portion of the excitation plate. Cover plate 730 may comprise the entire cover plate or a portion of the cover plate. Light emitting device 700 also includes large quantum dots 750 and small quantum dots 754 suspended in a clear or transparent fluid 757. As shown in FIG. 7A, the excitation plate 720 and cover plate 730 may be arranged in a parallel plate configuration.

As shown in FIG. 7A, a plurality of the small quantum dots 754 have been moved to be within the evanescent field 780 of excitation plate 720 and are emitting light. In contrast, none of the large quantum dots 750 have been moved to be within the evanescent field of excitation plate 720. The small quantum dots 754 and the large quantum dots 750 may differ by their emission color and/or by their charge-to-size ratio. The charge-to-size ratio may determine the velocity of the charged quantum dots when moving through the same fluid while the same electrostatic field is being applied between the excitation plate 720 and the cover plate 730. This effect may be exploited to control the spatial distribution of the two different types of quantum dots by timing an electric field applied to a particular pixel location (e.g., by applying the electric field for only a pulse duration).

Because quantum dot velocity depends on the size of the quantum dot, the charge associated with the quantum dot, and the viscosity of the fluid in which the quantum dots are suspended, the smaller quantum dots 754 may be moved to be within the evanescent field 780 of excitation plate 720 within a shorter period of time compared with the larger quantum dots 750. Taking advantage of the fact that the smaller quantum dots 754 may move more quickly through the fluid 757 allows a light emitting device to separately control the location of two different types of quantum dots. Thus, it is possible to control the emission of light from each of two different types of quantum dots, even though the two different types of quantum dots are in the same fluid and associated with the same pixel location. To emit light from both of the two different types of quantum dots, a long pulse which attracts both of the two different types of quantum dots to the surface of excitation plate 720 may be applied.

In one embodiment, all charged quantum dots are first moved to the surface of cover plate 730. Next, a short duration pulse quickly moves smaller quantum dots 754 towards the excitation plate 720. Because the smaller quantum dots 754 move more quickly through the fluid 757, after the period of time associated with the short duration pulse has completed, only a subset of the smaller quantum dots 754 may have been moved to be within the evanescent field 780 of excitation plate 720. Thus, only the subset of the smaller quantum dots 754 will emit light, while none of the larger quantum dots 750 will emit light.

Figure 7B:
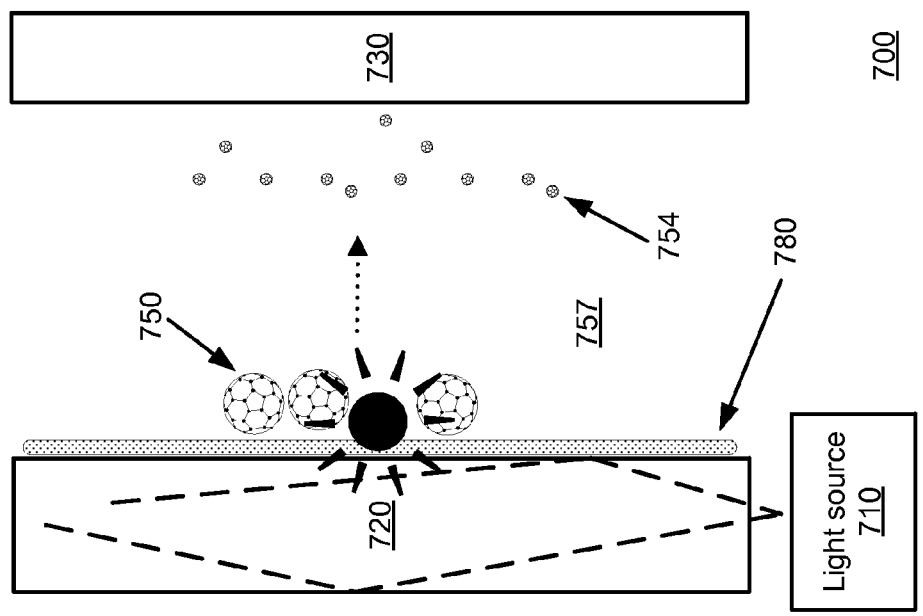
FIG. 7B depicts one embodiment of a light emitting device emitting light associated with larger quantum dots.

FIG. 7B depicts one embodiment of a light emitting device 700 emitting light associated with larger quantum dots. The light emitting device 700 of FIG. 7B is identical in structure to the light emitting device 700 of FIG. 7A. However, in order for the larger quantum dots 750 to emit light, a reverse excitation process must be performed. During the reverse excitation process, all charged quantum dots are first moved to the surface of excitation plate 720. Next, a short duration pulse quickly moves the smaller quantum dots 754 towards the cover plate 730 and away from the excitation plate 720. Because the larger quantum dots 750 move more slowly through the fluid 757, after the period of time associated with the short duration pulse has completed, only the smaller quantum dots 754 will have been completely moved away from the evanescent field 780 of excitation plate 720. Thus, only a subset of the larger quantum dots 750 will emit light, while none of the smaller quantum dots 754 will emit light.

In some embodiments, different types of quantum dots are excited at the same time to emit white light. Color filters may subsequently be used to generate different colors of light per pixel (or subpixel) from the white light.

In some embodiments, a first set of quantum dots of a first polarity and a second set of quantum dots of a second polarity may be suspended within a transparent fluid. The first polarity and the second polarity may both be positive or negative. In one embodiment, the first polarity is positive and the second polarity is negative. Electric fields may be generated to attract the first set of quantum dots towards the excitation plate, while repelling the second set of quantum dots.

Figure 7C:
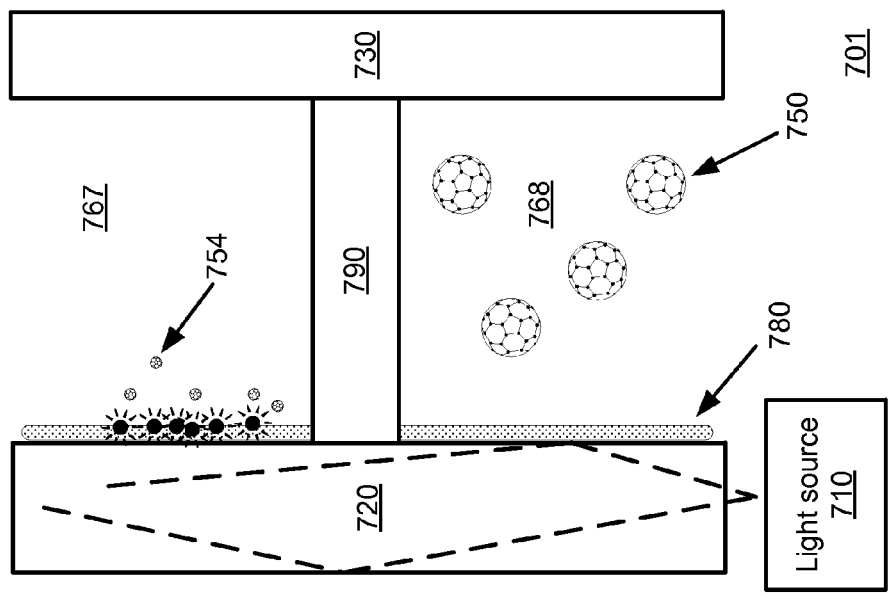
FIG. 7C depicts one embodiment of a light emitting device utilizing one or more barriers.

FIG. 7C depicts one embodiment of a light emitting device 701 utilizing one or more barriers. Light emitting device 701 is one example of a display device such as display 149 in FIG. 1. Light emitting device 701 includes an excitation plate 720, a cover plate 730, light source 710, and a barrier 790. The barrier 790 may comprise a transparent glass or plastic layer. The barrier 790 separates smaller quantum dots 754 from larger quantum dots 750. The smaller quantum dots 754 are suspended in fluid 767 and the one quantum dots 750 are suspended in fluid 768. A first electric field may be applied to the region associated with smaller quantum dots 754, while a second electric field may be applied to the region associated with the larger quantum dots 750. In one embodiment, each pixel location within a display is broken up into three subpixels. The three sub pixels may correspond with three different types of charged quantum dots. Each of the three different types of charged quantum dots may be confined to a particular region through the use of one or more barriers. In one example, the three different types of charged quantum dots are associated with the colors red, green, and blue.

Figure 7D:
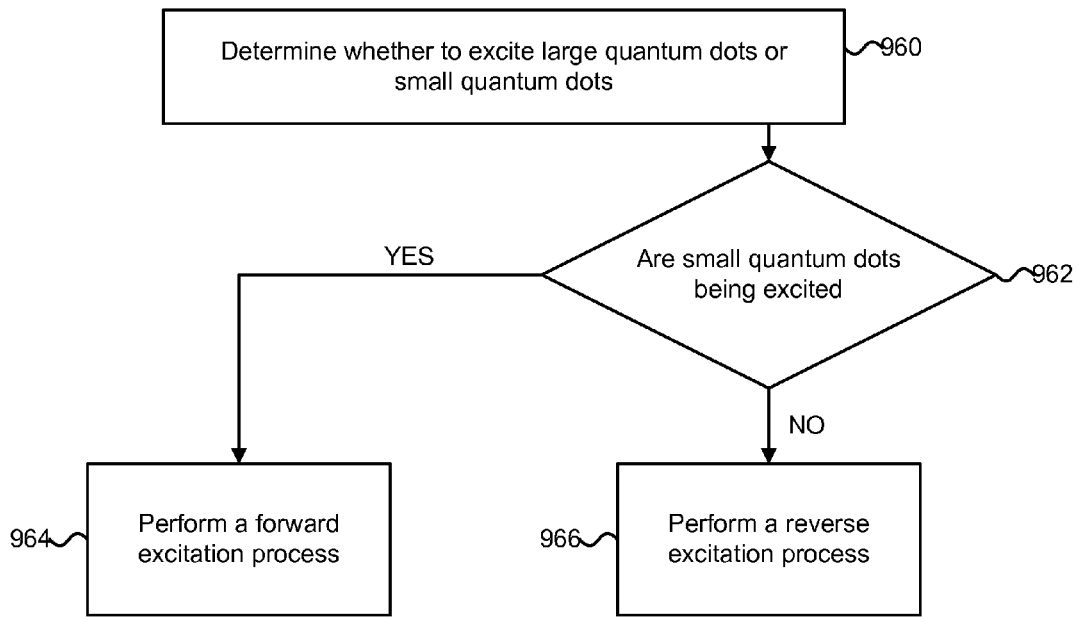
FIG. 7D is a flowchart describing one embodiment of a process for performing an excitation process utilizing both small and large quantum dots.

FIG. 7D is a flowchart describing one embodiment of a process for performing an excitation process utilizing both small and large quantum dots. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 7D is performed by a processor such as processor 146 in FIG. 1. The process depicted in FIG. 7D is one example of a process for implementing step 912 in FIG. 6B.

In step 960, it is determined whether large quantum dots or small quantum dots are to be excited. In step 962, it is determined whether the small quantum dots are to be excited. If the small quantum dots are to be excited, then a forward excitation process is performed in step 964. Otherwise, if the large quantum dots are to be excited, then a reverse excitation process is performed in step 966. The forward excitation process of step 964 may be performed using the process depicted in FIG. 6C. The reverse excitation process of step 966 may be similar to the forward excitation process except that rather than attracting the smaller quantum dots to the surface of the excitation plate, instead, the smaller quantum dots are quickly moved away from the surface of the excitation plate.

Figure 7E:
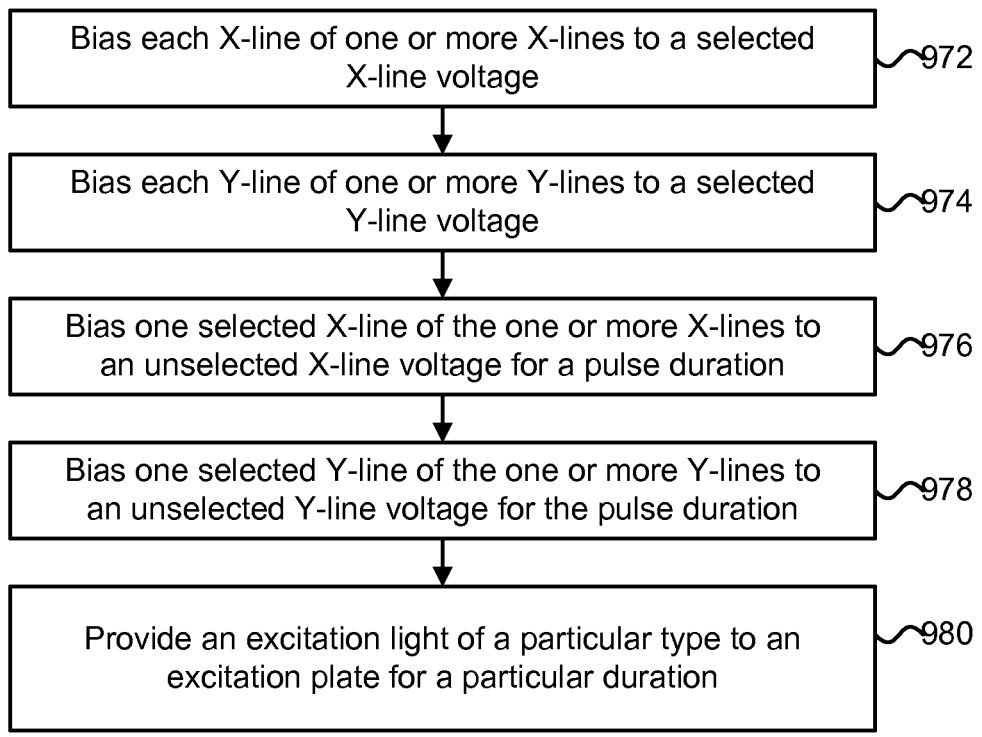
FIG. 7E is a flowchart describing one embodiment of a process for performing a reverse excitation process.

FIG. 7E is a flowchart describing one embodiment of a process for performing a reverse excitation process. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 7E is performed by a processor such as processor 146 in FIG. 1. The process depicted in FIG. 7E is one example of a process for implementing step 966 in FIG. 7D.

Prior to performing a reverse excitation process, excitation light used to create an evanescent field may be turned off in order to prevent unintentional light emission. In step 972, each X-line of one or more X-lines is biased to a selected X-line voltage. The one or more X-lines may comprise one or more excitation plate electrodes. In step 974, each Y-line of one or more Y-lines is biased to a selected Y-line voltage. The one or more Y-lines may comprise one or more cover plate electrodes. Together, steps 972 and 974 produce one or more electric fields in order to move all charged quantum dots to be located near the surface of the excitation plate. In step 976, one selected X-line of the one or more X-lines is biased to an unselected X-line voltage for a pulse duration. In step 978, one selected Y-line of the one or more Y-lines is biased to an unselected Y-line voltage for the pulse duration. In one embodiment, the steps of biasing the one selected X-line to an unselected X-line voltage and biasing the one selected Y-line to an unselected Y-line voltage may be performed concurrently.

The pulse duration may be set in order to move charged quantum dots from an initial position associated with a selected region near the surface of the excitation plate to a location away from the surface of the excitation plate. The determination of the pulse duration may take into consideration the size of the charged quantum dots, the amount of charge associated with the charged quantum dots, and the viscosity of the liquid in which the charged quantum dots are held in suspension.

In step 980, an excitation light of a particular type is provided to an excitation plate for a particular duration. The particular duration may correspond with the excitation duration determined in step 904 of FIG. 6B. The particular type of excitation light may correspond with the type of excitation light determined in step 906 of FIG. 6B. The excitation light may be emitted from a light source, such as light source 610 in FIG. 2. Pulsing the excitation light for the particular duration after the charged quantum dots have been moved away from the surface of the excitation plate may allow for better control of the excitation process.

Figure 7F:
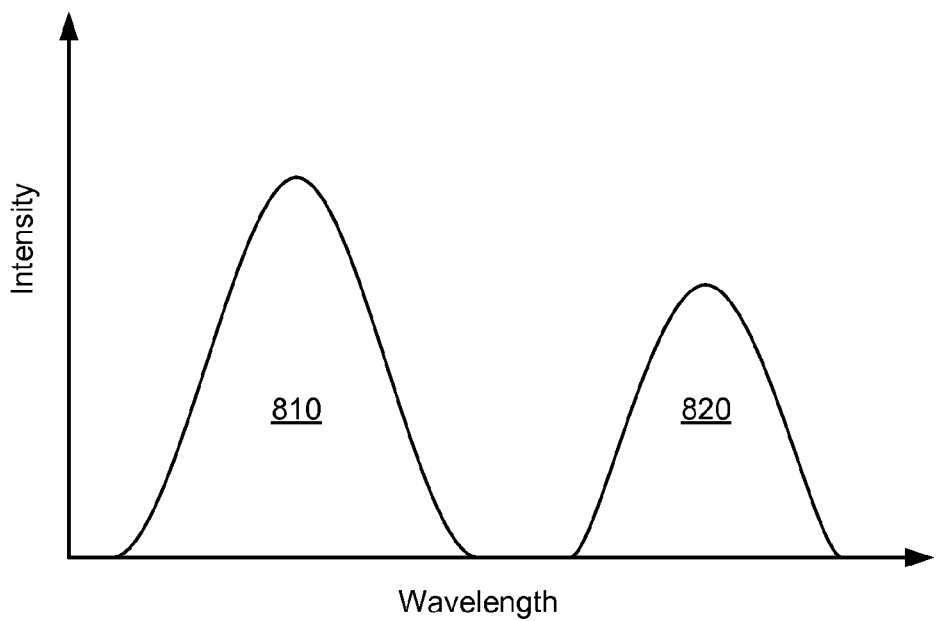
FIG. 7F depicts a graph of light absorption spectra and light emission spectra associated with a particular quantum dot.

FIG. 7F depicts a graph of light absorption spectra 810 and light emission spectra 820 associated with a particular quantum dot. For example, the particular quantum dot may correspond with the charged quantum dots 650 in FIG. 2. When incoming light with a corresponding wavelength within the light absorption spectra 810 is absorbed by the particular quantum dot, the particular quantum dot may emit light with a corresponding wavelength within the light emission spectra 820. The light emitted by the particular quantum dot may be at a lower energy and comprise a longer wavelength compared to the light absorbed by the particular quantum dot. The graph depicted in FIG. 7F shows that in order for the particular quantum dot to emit light, the particular quantum dot must first be excited with light with a corresponding wavelength within the light absorption spectra 810. Otherwise, the particular quantum dot will not emit light.

Figure 7G:
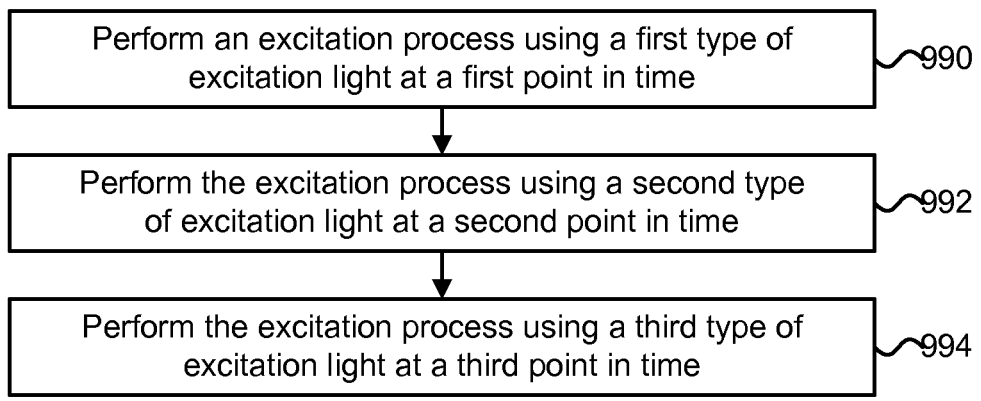
FIG. 7G is a flowchart describing one embodiment of a process for performing an excitation process on three different types of charged quantum dots.

FIG. 7G is a flowchart describing one embodiment of a process for performing an excitation process on three different types of charged quantum dots. The aforementioned process may be performed continuously and by one or more computing devices. Each step in the aforementioned process may be performed by the same or different computing devices as those used in other steps, and each step need not necessarily be performed by a single computing device. In one embodiment, the process of FIG. 7G is performed by a processor such as processor 146 in FIG. 1. The process depicted in FIG. 7G is one example of a process for implementing step 912 in FIG. 6B.

Each type of quantum dot of the three different types of charged quantum dots may be associated with a particular light absorption spectra that is different from the light absorption spectrums of the other different types of charged quantum dots. This allows the ability to time multiplex the excitation of each of the three different types of charged quantum dots. For example, a first type of excitation light may be used at a first point in time to only excite a first type of quantum dot and to not excite the other different types of charged quantum dots. Subsequently, a second type of excitation light may be used at a second point in time to only excite a second type of quantum dot and to not excite the other different types of charged quantum dots. Thus, different types of charged quantum dots may all be moved to be within an evanescent field, but only a particular type of quantum dot may be excited by the particular type of excitation light used to create the evanescent field.

In step 990, an excitation process is performed using a first type of excitation light at a first point in time. The first type of excitation light may comprise infrared light. The first type of excitation light may only cause quantum dots of a first type to emit light. The first type of quantum dots may emit light of a red color. In step 992, the excitation process is performed using a second type of excitation light at a second point in time. The second type of excitation light may comprise light of an orange color. The second type of excitation light may only cause quantum dots of a second type to emit light. The second type of quantum dots may emit light of a green color. In step 994, the excitation process is performed using a third type of excitation light at a third point in time. The third type of excitation light may comprise light of a green color. The third type of excitation light may only cause quantum dots of a third type to emit light. The third type of quantum dots may emit light of a blue color. The third point in time may be subsequent to the second point in time. The second point in time may be subsequent to the first point in time. By time multiplexing the excitation of different types of quantum dots, the different types of quantum dots may be moved at the same time and be associated with the same pixel location, but only a particular type of quantum dots will be excited at a particular point in time.

Figure 8:
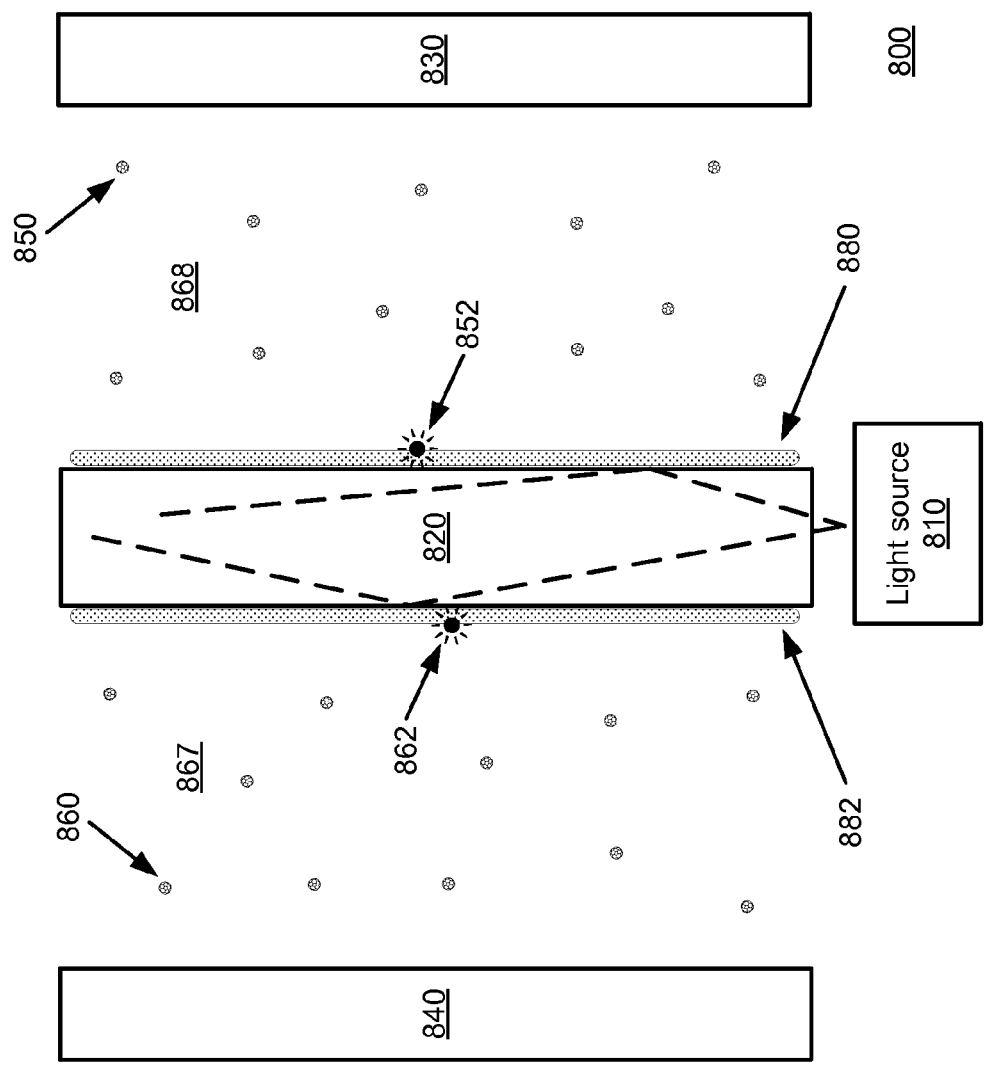
FIG. 8 depicts one embodiment of a light emitting device.

FIG. 8 depicts one embodiment of a light emitting device 800. Light emitting device 800 is one example of a display device such as display 149 in FIG. 1. Light emitting device 800 includes excitation plate 820, right cover plate 830, left cover plate 840, and light source 810. As depicted, excitation plate 820 may comprise the entire excitation plate or a portion of the excitation plate. Similarly, the left and right cover plates depicted may comprise either an entire cover plate or a portion of a cover plate. Light emitting device 800 also includes left quantum dots 860 suspended in a first fluid 867 and right quantum dots 850 suspended in a second fluid 868. As shown in FIG. 8, the excitation plate 820 and left cover plate 840 may be arranged in a parallel plate configuration. Similar to light emitting device 600 in FIG. 2, light source 810 may emit an excitation light which may be uniformly distributed throughout excitation plate 820. The excitation light may produce evanescent fields 880 and 882 via total internal reflection within excitation plate 820. A charged quantum dot 852 may be located within the evanescent field 880 and may emit light of a first color. A charged quantum dot 862 may be located within the evanescent field 882 and may emit light of a second color. In one embodiment, two different types of quantum dots (e.g., quantum dots of different sizes) may be suspended in the first fluid 867. In another embodiment, two other types of quantum dots may be suspended in the second fluid 868. The two other types of quantum dots suspended in the second fluid 868 may be different from the two different types of quantum dots suspended in the first fluid 867. Thus, color combinations associated with four different types of quantum dots may be emitted.

Figure 9:
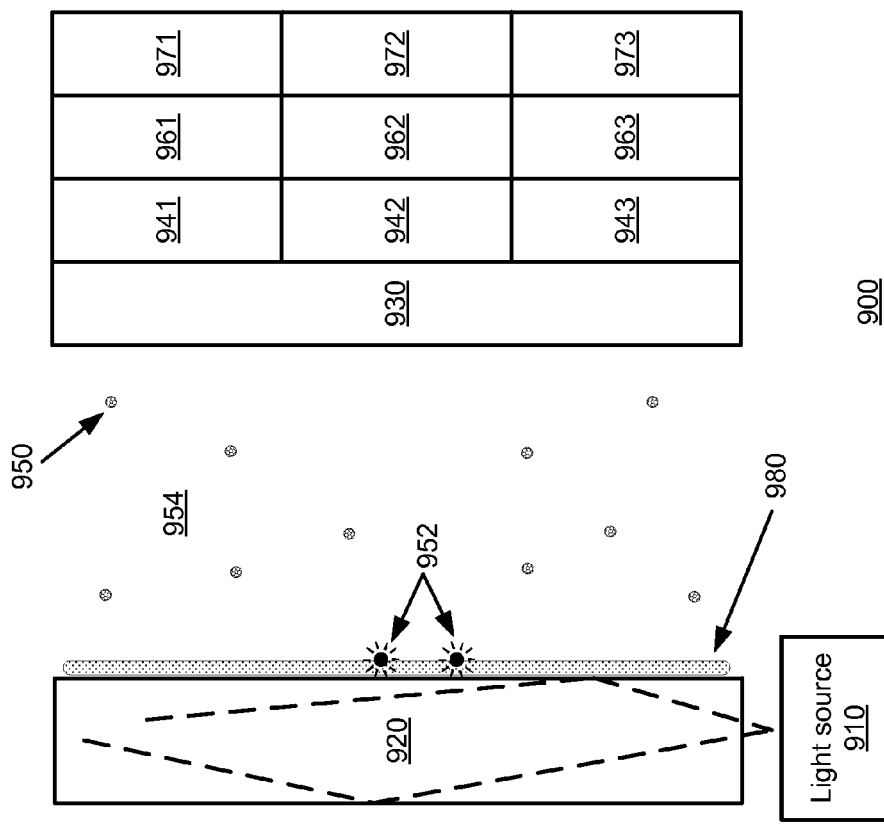
FIG. 9 depicts one embodiment of a light emitting device.

FIG. 9 depicts one embodiment of a light emitting device 900. Light emitting device 900 is one example of a display device such as display 149 in FIG. 1. Light emitting device 900 includes excitation plate 920, cover plate 930, and light source 910. As depicted, excitation plate 920 may comprise the entire excitation plate or a portion of the excitation plate. Cover plate 930 may comprise the entire cover plate or a portion of the cover plate. Light emitting device 900 also includes charged quantum dots 950 suspended in a clear or transparent fluid 954. As shown in FIG. 9, the excitation plate 920 and cover plate 930 may be arranged in a parallel plate configuration. Similar to light emitting device 600 in FIG. 2, light source 910 may emit an excitation light which may be uniformly distributed throughout excitation plate 920. The excitation light may produce evanescent fields 980 via total internal reflection within excitation plate 920. Charged quantum dots 952 may be located within the evanescent field 980 and may emit light associated with a particular wavelength.

Light emitted device 900 includes color selective reflectors 941-943, color strips 961-963, and color filters 971-973. The color strips 961-963 may be utilized to generate one or more colors (e.g., red, green, and blue colors) from a single source of light. To improve transmission efficiency, the color strips 961-963 may utilize quantum dots to emit the one or more colors. The color strips 961-963 may be associated with pixel rows or columns. The color selective reflectors 941-943 may allow light emitted from charged quantum dots 952 (e.g., blue light) to pass through while preventing ambient light and/or light emitted from color strips 961-963 from unintentionally exciting charged quantum dots 950. Furthermore, color selective reflectors 941-943 may redirect light generated from color strips 961-963.

The color selective reflectors 941-943 may include one or more dichroic filters or interference filters. The color selective reflectors 941-943 may also include liquid crystal materials such as CH-LCD. Color selective reflector 941 may include a dichroic filter that allows light emitted from charged quantum dots 952 (e.g., light of a blue color) to pass through while reflecting light of other colors (e.g., light of a red color). Color selective reflector 942 may include a dichroic filter that allows light emitted from charged quantum dots 952 (e.g., light of a blue color) to pass through while reflecting light of other colors (e.g., light of a green color). Color selective reflector 943 may include a dichroic filter that allows light emitted from charged quantum dots 952 (e.g., light of a blue color) to pass through while reflecting light of other colors (e.g., light of a red or green color).

The color strips 961-963 may include quantum dots within a solid transparent material (e.g., transparent plastic). The quantum dots within color strips 961-963 may be excited by light emitted from charged quantum dots 952. For example, light of a first frequency emitted by charged quantum dots 952 (e.g., blue light) may cause quantum dots within a particular color strip to emit light of a second frequency (e.g., red light). In one embodiment, color strip 961 includes quantum dots capable of emitting light associated with the color red, color strip 962 includes quantum dots capable of emitting light associated with the color green, and color strip 963 does not include quantum dots and is completely transparent.

There are several ways to mitigate contrast reduction caused by unintentional quantum dot excitation due to ambient light with a high blue or near UV component. In one example, quantum dots may be utilized with a narrow excitation spectrum that corresponds with the particular wavelengths associated with the desired excitation light. In another example, one or more color selective filters and/or color selective coatings may be used to block the high blue and/or near UV components of the ambient light.

As shown in FIG. 9, the color filters 971-973 may include color filters or dichroic filters (e.g., dichroic mirrors) that allow light emitted from quantum dots within color strips 961-963 to pass through while reflecting light of other colors (e.g., high blue or near UV light). In one embodiment, color filter 971 includes a dichroic filter that allows light emitted from quantum dots within color strip 961 (e.g., light of a red color) to pass through while reflecting light of other colors (e.g., light of a blue or green color). Color filter 972 may include a dichroic filter that allows light emitted from quantum dots within color strip 962 (e.g., light of a green color) to pass through while reflecting light of other colors (e.g., light of a blue color). Color filter 973 may include a dichroic filter that allows light emitted from charged quantum dots 952 (e.g., light of a blue color) to pass through while reflecting light of other colors (e.g., high blue or near UV light).

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

For purposes of this document, it should be noted that the drawings may not necessarily be drawn to scale.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A light emitting device, comprising:
an excitation plate;
a first set of electrodes connected to the excitation plate, at least one electrode of the first set of electrodes is biased to a first voltage at a first point in time, the first set of electrodes is arranged in a first direction;
a second set of electrodes connected to the cover plate, at least one electrode of the second set of electrodes is biased to a second voltage at the first point in time, the second set of electrodes is arranged in a second direction, the second direction is perpendicular to the first direction;
a cover plate; and
quantum dots, the quantum dots suspended within a liquid between the excitation plate and the cover plate, the quantum dots emit light in response to an evanescent field, the evanescent field is generated by one or more electromagnetic waves undergoing total internal reflection within the excitation plate, the quantum dots are attracted to the at least one electrode of the first set of electrodes at the first point in time.

2. The device of claim 1, further comprising:
a second cover plate;
different quantum dots, the different quantum dots suspended within a second liquid between the excitation plate and the second cover plate; and
a third set of electrodes connected to the second cover plate, at least one electrode of the third set of electrodes is biased to a third voltage, the third set of electrodes are arranged in a third direction, the third direction is perpendicular to the first direction, the quantum dots emit light of a first color, the different quantum dots emit light of a second color.

3. The device of claim 1, further comprising:
one or more micro-spheres, the quantum dots suspended within the one or more micro-spheres.

4. The device of claim 1, wherein:
the quantum dots include large quantum dots and small quantum dots, the large quantum dots emit light of a first color, the small quantum dots emit light of a second color.

5. The device of claim 4, wherein:
the large quantum dots and the small quantum dots are separated by a first barrier;
the liquid includes a non-conductive liquid;
the excitation plate includes a first transparent material; and
the first set of electrodes includes a second transparent material.

6. The device of claim 1, further comprising:
one or more color selective reflectors;
one or more color strips; and
one or more color filters, the one or more color selective reflectors redirect light emitted from the one or more color strips, the one or more color filters redirect at least one of high blue or UV light.

7. The device of claim 4, wherein:
the one or more electromagnetic waves include a first set of light waves at the first point in time and a second set of light waves at a second point in time, the second point in time is subsequent to the first point in time, the first set of light waves have wavelengths different from the second set of light waves, the first set of light waves excite the small quantum dots, the first set of light waves do not excite the large quantum dots.

8. The device of claim 1, further comprising:
a top plate, the top plate is biased to a third voltage at a first point in time, the quantum dots are attracted to the top plate at the first point in time.

9. A method for operating a light emitting device, comprising:
biasing a first conductor connected to an excitation plate to a first voltage; and
biasing a second conductor connected to a cover plate to a second voltage, the biasing of the first conductor causes charged quantum dots to accelerate towards the first conductor at a first point in time, the charged quantum dots are suspended within a liquid between the excitation plate and the cover plate, the charged quantum dots emit light in response to excitation light emitted from the excitation plate, the charged quantum dots include large quantum dots and small quantum dots, the large quantum dots emit light of a first color, the small quantum dots emit light of a second color, the large quantum dots and the small quantum dots are separated by a first barrier.

10. A method of claim 9, wherein:
the first voltage is greater than the second voltage at the first point in time, the second voltage is greater than the first voltage at a second point in time, the second point in time is subsequent to the first point in time;
the liquid includes a non-conductive liquid;
the excitation plate includes a first transparent material; and
the first set of electrodes includes a second transparent material.

11. The method of claim 9, wherein:
the excitation light includes light of a blue color;
the charged quantum dots emit light of a red color.

12. One or more storage devices containing processor readable code for programming one or more processors to perform a method for operating a display device comprising the steps of:
performing a display refresh operation, the display refresh operation includes moving charged quantum dots into a predetermined region between an excitation plate and a cover plate, the charged quantum dots suspended within a liquid between the excitation plate and the cover plate;
generating a first electric field across a first region at a first point in time, the first region is abutted by the excitation plate on a first side and the cover plate on a second side, the first region includes at least a subset of the charged quantum dots, the generating of the first electric field causes the at least a subset of the charged quantum dots to be attracted to the excitation plate at the first point in time; and
generating an evanescent field associated with the excitation plate at a second point in time, the second point in time is subsequent to the first point in time, the at least a subset of the charged quantum dots emit light in response to the evanescent field at the second point in time, the evanescent field is generated by one or more light waves undergoing total internal reflection within the excitation plate, the charged quantum dots include large quantum dots and small quantum dots, the large quantum dots emit light of a first color, the small quantum dots emit light of a second color, each of the large quantum dots are larger in size compared with each of the small quantum dots, the first region includes a first barrier, the large quantum dots and the small quantum dots are separated by the first barrier.

13. A one or more storage devices of claim 12, wherein:
the liquid includes a non-conductive liquid;
the excitation plate includes a first transparent material; and
the cover plate includes a second transparent material.

14. The one or more storage devices of claim 13, wherein:
the excitation plate comprises glass; and
the liquid comprises an organic solvent.

* * * * *